United States Patent
Wang et al.

(10) Patent No.: US 11,204,438 B2
(45) Date of Patent: Dec. 21, 2021

(54) DETERMINING ANISOTROPIC SUBSURFACE PROPERTIES WITH ELECTROMAGNETIC MEASUREMENTS

(71) Applicant: Schlumberger Technology Corporation, Sugar Land, TX (US)

(72) Inventors: Gong Li Wang, Sugar Land, TX (US); Koji Ito, Sugar Land, TX (US); Xiao Bo Hong, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/663,988

(22) Filed: Oct. 25, 2019

(65) Prior Publication Data
US 2021/0124082 A1 Apr. 29, 2021

(51) Int. Cl.
*G01V 3/38* (2006.01)
*G01V 3/30* (2006.01)
*G01V 99/00* (2009.01)

(52) U.S. Cl.
CPC .......... *G01V 3/38* (2013.01); *G01V 3/30* (2013.01); *G01V 99/005* (2013.01)

(58) Field of Classification Search
CPC ... G01V 3/38; G01V 3/30; G01V 3/26; G01V 3/18; G01V 3/00; G01V 99/005; G01V 99/00
See application file for complete search history.

(56) References Cited

U.S. PATENT DOCUMENTS

| | | | |
|---|---|---|---|
| 2006/0202806 A1* | 9/2006 | Bonner | G01V 3/28 340/289 |
| 2013/0080058 A1* | 3/2013 | Wu | G06F 19/00 702/7 |
| 2017/0075021 A1* | 3/2017 | Thiel | G01V 3/20 |

(Continued)

FOREIGN PATENT DOCUMENTS

EP 2320251 A2 5/2011

OTHER PUBLICATIONS

Ljasan et al., "inversion-based petrophysical interpretation of logging-while-drilling nuclear and resistivity measurements", Oct. 9, 2013, Society of Eploration Geophysicists, vol. 78 No. 6, pp. D473-D489. (Year: 2013).*

(Continued)

*Primary Examiner* — Mohamed Charioui
(74) *Attorney, Agent, or Firm* — Trevor G. Grove

(57) ABSTRACT

Properties of a geological formation, such as vertical resistivity values, horizontal resistivity values, dip, and azimuth may be determined by inverting electromagnetic (EM) well log data based at least in part on an anisotropic formation model and a cost function. The cost function may include a data misfit term, a smoothness term, and an entropy term. In some embodiments, one or more of the data misfit term, the smoothness term, and the entropy term may be represented as functions of vertical conductivity and horizontal conductivity. The cost function may include one or more regularization parameters that are based at least in part on the data misfit term. Further, the cost function may include one or more relaxation factors that are based at least in part on a ratio of the Hessians of the smoothness term and the data misfit term.

16 Claims, 11 Drawing Sheets

(56) References Cited

U.S. PATENT DOCUMENTS

2017/0254921 A1* 9/2017 Wu .................... G01V 3/28
2018/0038987 A1* 2/2018 Donderici ............ G01V 3/38

OTHER PUBLICATIONS

Anderson, B. I., T. D. Barber, and T. M. Habashy, 2002, The interpretation and inversion of fully triaxial induction data, A sensitivity study: Transactions of the SPWLA 43rd Annual Logging Symposium, Jun. 2-5, 2002 (14 pages).

Barber et al., 2004, Determining formation resistivity anisotropy in the presence of invasion, SPE 90526, presented at the SPE Annual Technical Conference and Exhibition, Houston, Texas, U.S.A., Sep. 26-29, 2004 (25 pages).

Cheryauka, A. B., and M. S. Zhdanov, 2001, Focusing inversion of tensor induction logging data in anisotropic formations and deviated well, Presented at SEG International Exposition and Annual Meeting, San Antonio, Texas, Sep. 9-14, 2001 (4 pages).

Habashy, T. M., and A. Abubakar, 2004, A general framework for constraint minimization for the inversion of electromagnetic measurements, Progress in Electromagnetic Research, 46, 265-312.

Lu, X., and D. L. Alumbaugh, 2001, One-dimensional inversion of three-component induction logging in anisotropic media, Presented at SEG International Exposition and Annual Meeting, San Antonio, Texas, Sep. 9-14, 2001 (4 pages).

Sun, K., et al., 2010, Evaluation of resistivity anisotropy and formation dip from directional electromagnetic tools while drilling, Transactions of the SPWLA 51st Annual Logging Symposium, Paper I, Jun. 19-23, 2010 (16 pages).

Tompkins, M. J., and D. L. Alumbaugh, 2002, A transversely isotropic 1-D electromagnetic inversion scheme requiring minimal a priori information, Presented at SEG International Exposition and Annual Meeting, Salt Lake City, Utah, Oct. 6-11, 2002 (4 pages).

Wang, H., T. Barber, R. Rosthal, J. Tabanou, B. Anderson, and T. Habashy, 2003, Fast and rigorous inversion of triaxial induction logging data to determine formation resistivity anisotropy, bed boundary position, relative dip and azimuth angle, Society of Exploration Geophysicists Expanded Abstracts, 22, 514 (4 pages).

Wang, H. et al., 2006a, Triaxial induction logging: Theory, modeling, inversion, and interpretation, Paper SPE 103897 presented at the SPE International Oil & Gas Conference and Exhibition, Beijing, China, Dec. 5-7, 2006 (19 pages).

Wang, H., T. Barber, C. Morriss, R. Rosthal, R. Hayden, and M. Markley, 2006b, Determining anisotropic formation resistivity at any relative dip using a multiarray triaxial induction tool, Paper SPE 103113 presented at the SPE Annual Technical Conference and Exhibition, San Antonio, Texas, USA., Sep. 24-27, 2006 (13 pages).

Wang, G. L. et al., , 2012, Triaxial induction applications in difficult and unconventional formations, Transactions of the 53rd SPWLA Annual Logging Symposium, Jun. 16-20, 2012, (14 pages).

Wu, P., G. Wang, and T. Barber, 2010, Efficient hierarchical processing and interpretation of triaxial induction data in formations with changing dip, Paper SPE 135442 presented at the SPE Annual Technical Conference and Exhibition, Florence, Italy, Sep. 19-22, 2010 (14 pages).

Yu, L., B. Kriegshäuser, O. Fanini, and J. Xiao, 2001, A fast inversion method for multicomponent induction log data, Presented at SEG International Exposition and Annual Meeting. San Antonio, Texas, Sep. 9-14.

Zhang, Z. J., N. Yuan, and R. Liu, 2012, 1-D inversion of triaxial induction logging in layered anisotropic formation, Progress in Electromagnetics Research B, 44, 383-403.

Zhang, Z., L. Yu, B. Kriegshäuser, and R. Chunduru, 2001, Simultaneous determination of relative angles and anisotropic resistivity using multicomponent induction logging data, Transactions of the SPWLA 42th Annual Logging Symposium, Jun. 17-20, 2001 (11 pages).

Zhdanov, M. S., A. B. Cheryauka, and E. Peksen, 2003, Sharp boundary inversion of tensor induction logging data, Transactions of the SPWLA 44th Annual Logging Symposium, Jun. 22-25, 2003 (13 pages).

* cited by examiner

DETERMINING ANISOTROPIC SUBSURFACE PROPERTIES WITH ELECTROMAGNETIC MEASUREMENTS

BACKGROUND

This disclosure relates to identifying properties of a geological formation using a downhole electromagnetic measurement. More specifically, this disclosure relates to identifying a horizontal resistivity, a vertical resistivity, dip, and azimuth of the geological formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well logging tools that are conveyed deep into the wellbore. The measurements may be used to infer properties or characteristics of the geological formation surrounding the wellbore. One example of such downhole well logging tools are electromagnetic downhole well logging tools (e.g., induction well logging tools and propagation induction well logging tools).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method. The method includes obtaining, via a processor, multi-axial electromagnetic (EM) measurements in a wellbore through a geological formation using one or more multi-axial EM downhole well logging tools. The method also includes inverting, via the processor, the multi-axial EM measurements based at least in part on a formation model to determine horizontal resistivity, vertical resistivity, dip and azimuth of the formation, wherein inverting the multi-axial EM measurements based at least in part on the formation model comprises minimizing a cost function having a data misfit term, an entropy term, and a smoothness term, wherein the smoothness term comprises a horizontal smoothness term, and a vertical smoothness term. Further, the method includes generating, via the processor, horizontal conductivity log or vertical conductivity log, or both, of the geological formation based at least in part on the output of the inversion of the multi-axial EM measurements.

Another embodiment of the present disclosure relates to an article of manufacture comprising tangible, non-transitory, machine-readable media comprising instructions that, when executed by a processor, cause the processor to receive multi-axial electromagnetic (EM) measurements associated with a geological formation obtained by one or more multi-axial EM well logging tools. The instructions also cause the processor to invert the multi-axial EM measurements based at least in part on a formation model to determine horizontal resistivity, vertical resistivity, dip and azimuth of the formation, wherein inverting the multi-axial EM measurements based at least in part on the formation model comprises minimizing a cost function having a data misfit term, an entropy term, and a smoothness term. The smoothness term includes a horizontal smoothness term based at least in part on a horizontal relaxation term. The smoothness term also includes a vertical smoothness term based at least in part on a vertical relaxation term, wherein the vertical relaxation term, the horizontal relaxation term, or both, are based at least in part on a ratio of the smoothness term and the data misfit term. Further, the instructions cause the processor to generate a horizontal conductivity log, a vertical conductivity log, or both based at least in part on the output of the inversion of the multi-axial EM measurements.

Another embodiment of the present disclosure relates to a system. The system includes one or more multi-axial electromagnetic (EM) well logging tools configured to obtain one or more multi-axial EM measurements from a geological formation. The system also includes a processor and a memory storing instructions configured to be executed by the processor. The instructions cause the processor to receive the multi-axial EM measurements from the one or more multi-axial EM well logging tools. The instructions also cause the processor to invert the multi-axial EM measurements based at least in part on a formation model, wherein inverting comprises minimizing a cost function having a data misfit term, a smoothness term, and an entropy term to determine horizontal resistivity, vertical resistivity, dip and azimuth of the formation. Inverting the multi-axial EM measurements comprises dynamically adjusting one or more regularization terms during the inversion based at least in part on the data misfit term, wherein dynamically adjusting the one or more regularization terms modifies a weight of the smoothness term, the entropy term, or both. Further, the instructions cause the processor to generate a plurality of horizontal resistivity values, a plurality of vertical resistivity values associated with the geological formation based at least in part on the output of the inversion of the multi-axial EM measurements.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
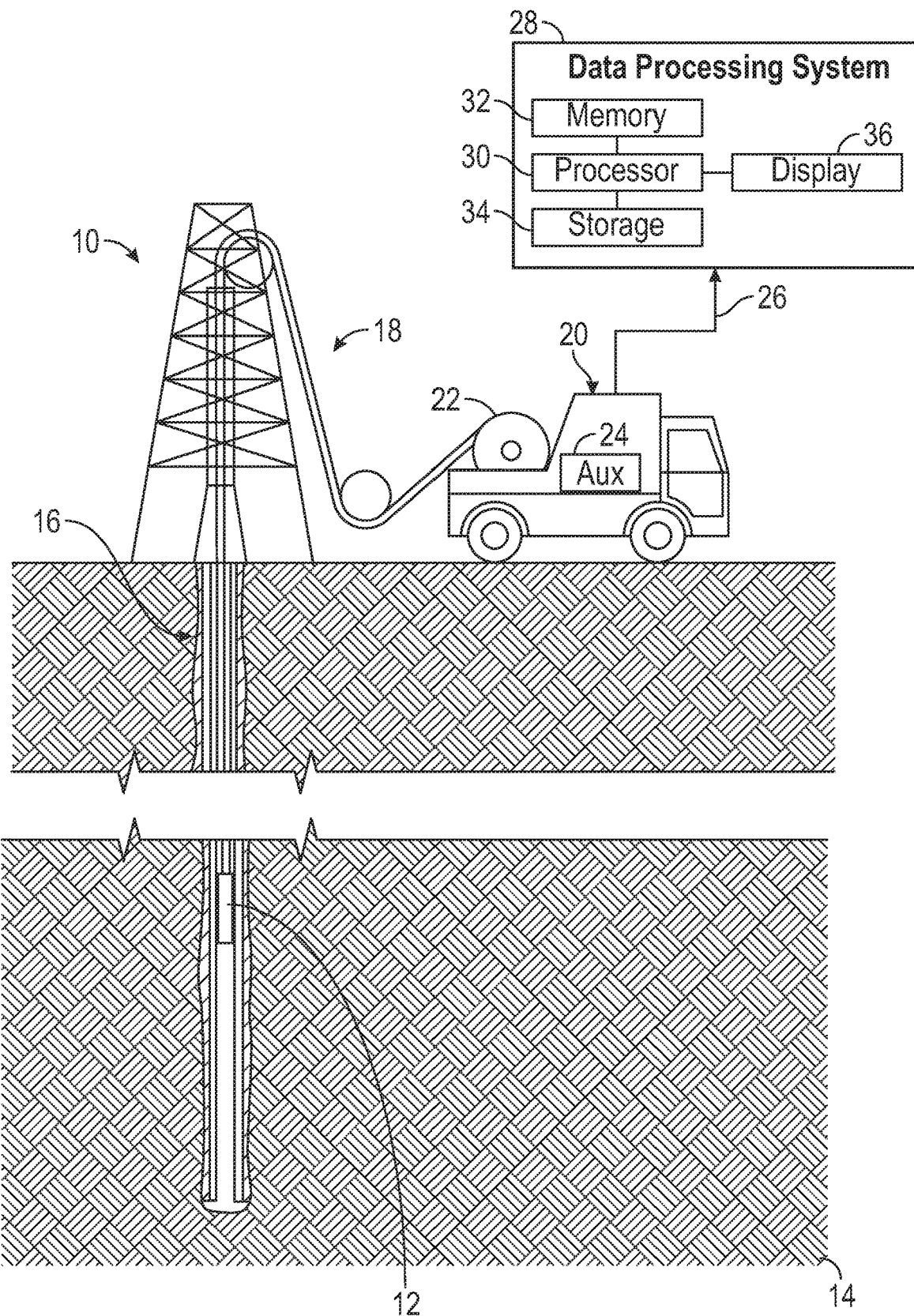
FIG. 1 is a schematic diagram of a well logging system that may obtain electromagnetic (EM) measurements that may be used to identify formation horizontal resistivity, vertical resistivity, dip and azimuth, in accordance with aspects of the present disclosure.

One or more specific embodiments of the present disclosure will be described below. These described embodiments are examples of the presently disclosed techniques. Additionally, in an effort to provide a concise description of these embodiments, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, oil and gas exploration organizations may make certain oil and gas production decisions, such as determining where to drill, based on well log data. More specifically, a well logging downhole tool obtains well logging measurements, which may be processed (e.g., normalized, de-noised, provided as inputs to a model, etc.) by a suitable computing device to generate the well log data. As referred to herein, the "well log" is a measurement or a property derived from measurements versus depth or time, or both, of one or more properties (e.g., resistivity, conductivity, dip and azimuth, and the like) in or around a wellbore, and thus, may be used to identify a location within in the wellbore that corresponds to an area of interest (e.g., hydrocarbons, an organic deposit, a "bed" or layer of sedimentary rock, or stratum, and the like). At least in some instances, the well log data may be transformed into one or more visual representations (e.g., a well log) that are presented as hard copies or on an electronic display, where each visual representation of the one or more visual representations may depict the well log data resulting from the well logging measurements.

One type of well logging measurement that may be used to inform the oil and gas production decisions are electromagnetic (EM) well logging measurements. In general, electromagnetic well logging measurements may be obtained using one or more electromagnetic well logging tools that each include a pair of transmitter coils and receiver coils. Conventional electromagnetic well logging tools (e.g., electromagnetic well logging tools using only coaxial transmitter coils and coaxial receiver coils) may obtain electromagnetic well logging measurements (e.g., induction well logging measurements or propagation well logging measurements) that are processed to generate resistivity or conductivity well logs, but lack the sensitivity to generate anisotropic resistivity or conductivity well logs (e.g., when a horizontal resistivity or conductivity differs from vertical resistivity or conductivity). Existing processing methods for electromagnetic well logging measurements involve inverting the EM well logging measurements using a parametric formation model wherein a cost function quantifies an error between the simulated and the field EM well logging measurements, and the formation model may be modified based on the error (e.g., iteratively). As used herein, a "horizontal resistivity" is generally resistivity in a direction parallel to a bedding plane or interface, and a "vertical resistivity" is generally resistivity in a direction perpendicular to the bedding plane or interface. Existing processing methods do not have sufficient resolution for identifying certain geological formations, such as thin beds (e.g., 2 ft, 1 ft., or less than 1 ft.).

Accordingly, the present disclosure relates to techniques for generating anisotropic resistivity (e.g., or conductivity) logs as well as dip and azimuth logs by processing anisotropic resistivity well log measurements. In general, anisotropic resistivity well log measurements may be acquired by a multi-axial EM well logging tool (e.g., having a multi-axial transmitter coil and/or a multi-axial receiver coil). For example, the multi-axial EM well logging tool may be a tri-axial well logging tool. It should be noted that the multi-axial transmitter coil and the multi-axial receiver coil may both be transverse, both be tilted, both be axial, one axial and the other transverse or tilted, or one transverse and the other tilted. As used herein, "transverse", "axial", and "tilted" refer to a relative orientation of the dipole moments of the transmitter coil and the receiver coil relative to the longitudinal axis of the tool.

In some embodiments, the resistivity well log measurements are inverted based on a cost function that includes a plurality of terms associated with a horizontal resistivity and a vertical resistivity. More specifically, the cost function may include a data misfit term, an entropy term, and a smoothness term. As discussed in more detail below with regards to Eqns. (1)-(4), each term of the last two terms (e.g., the entropy term, and the smoothness term) may include a horizontal term (e.g., a horizontal entropy term, and a horizontal smoothness term) and a vertical term (e.g., a vertical entropy term, and a vertical smoothness term). In some embodiments, the horizontal smoothness term and the vertical smoothness term may each include a respective relaxation factor that generally accounts for a difference of sensitivity between a vertical conductivity and a horizontal conductivity that is a factor in the EM well logging. In some embodiments, the inversion may include determining two regularization terms that may be represented as being proportional to the data misfit term to avoid potential bias that may result from the regularization terms. In this way, the techniques of the present disclosure improve methods for determining physical properties of geological formations where anisotropy in conductivity and/or resistivity may exist by including the vertical terms and the horizontal terms in the cost function so the resolution of the anisotropy (e.g., variation of vertical resistivity) is not suppressed during the inversion.

With this in mind, FIG. 1 illustrates a well logging system 10 that may employ the systems and methods of this disclosure. The well logging system 10 may be used to convey a electromagnetic (EM) well logging tool 12 through a geological formation 14 via a wellbore 16. The EM well logging tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the EM well logging tool 12.

Moreover, although the EM well logging tool 12 is described as a wireline downhole tool, it should be appreciated that any suitable conveyance may be used. For example, the EM well logging tool 12 may instead be conveyed as a logging-while-drilling (LWD) tool as part of a bottom hole assembly (BHA) of a drill string, conveyed on a slickline or via coiled tubing, and so forth. For the purposes of this disclosure, the EM well logging tool 12 may be any suitable measurement tool that obtains NMR logging measurements through depths of the wellbore 16.

Many types of EM well logging tools 12 may obtain EM logging measurements in the wellbore 16. These include, for example, the Rt Scanner, the LWD Periscope and Geosphere tools by Schlumberger Technology Corporation, but EM logging measurements from other downhole tools by other manufacturers may also be used. The EM well logging tool 12 may provide EM logging measurements 26 to a data processing system 28 via any suitable telemetry (e.g., via electrical signals pulsed through the geological formation 14 or via mud pulse telemetry). The data processing system 28 may process the EM logging measurements 26 to identify a horizontal conductivity and/or horizontal resistivity, a vertical conductivity and/or vertical resistivity, a dip and an azimuth at various depths of the geological formation 14 in the wellbore 16.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the EM logging measurements 26.

Figure 2:
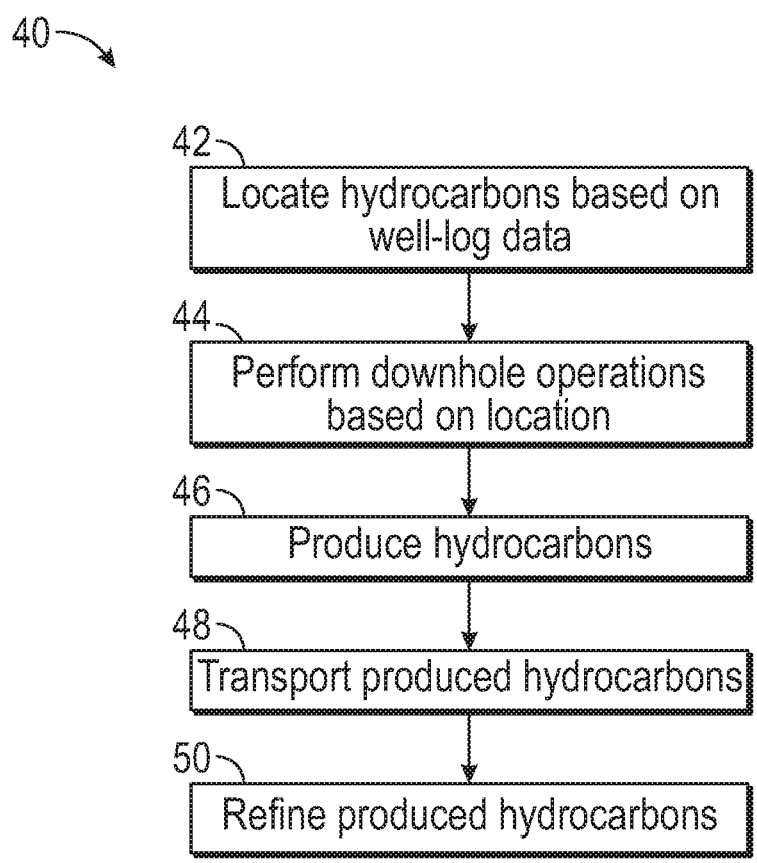
FIG. 2 illustrates a flow chart of various processes that may be performed based on analysis of EM well log data, in accordance with aspects of the present disclosure.

FIG. 2 illustrates a method 40 of various processes that may be performed based on analysis of well logs, in accordance with aspects of the present disclosure. A location of hydrocarbon deposits within a geological formation may be identified (process block 42) based on well log measurements. In some embodiments, the well log measurements may be analyzed to generate a map or profile that illustrates regions of interest with the geological formation.

Based on the identified locations and properties of the hydrocarbon deposits, certain downhole operations on positions or parts of the geological formation 14 may be performed (process block 44). That is, hydrocarbon exploration organizations may use the locations of the hydrocarbon deposits to determine locations in the wellbore to isolate for extracting liquid, frack, and/or drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 14, the hydrocarbons that are stored in the hydrocarbon deposits may be produced (block 46) via natural flowing wells, artificial lift wells, and the like. Further, the produced hydrocarbons may be transported (block 48) to refineries and the like via transport vehicles, pipelines, and the like. Further still, the produced hydrocarbons may be processed (block 50) according to various refining procedures to develop different products using the hydrocarbons.

It should be noted that the processes discussed with regard to the method 40 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

Figure 3:
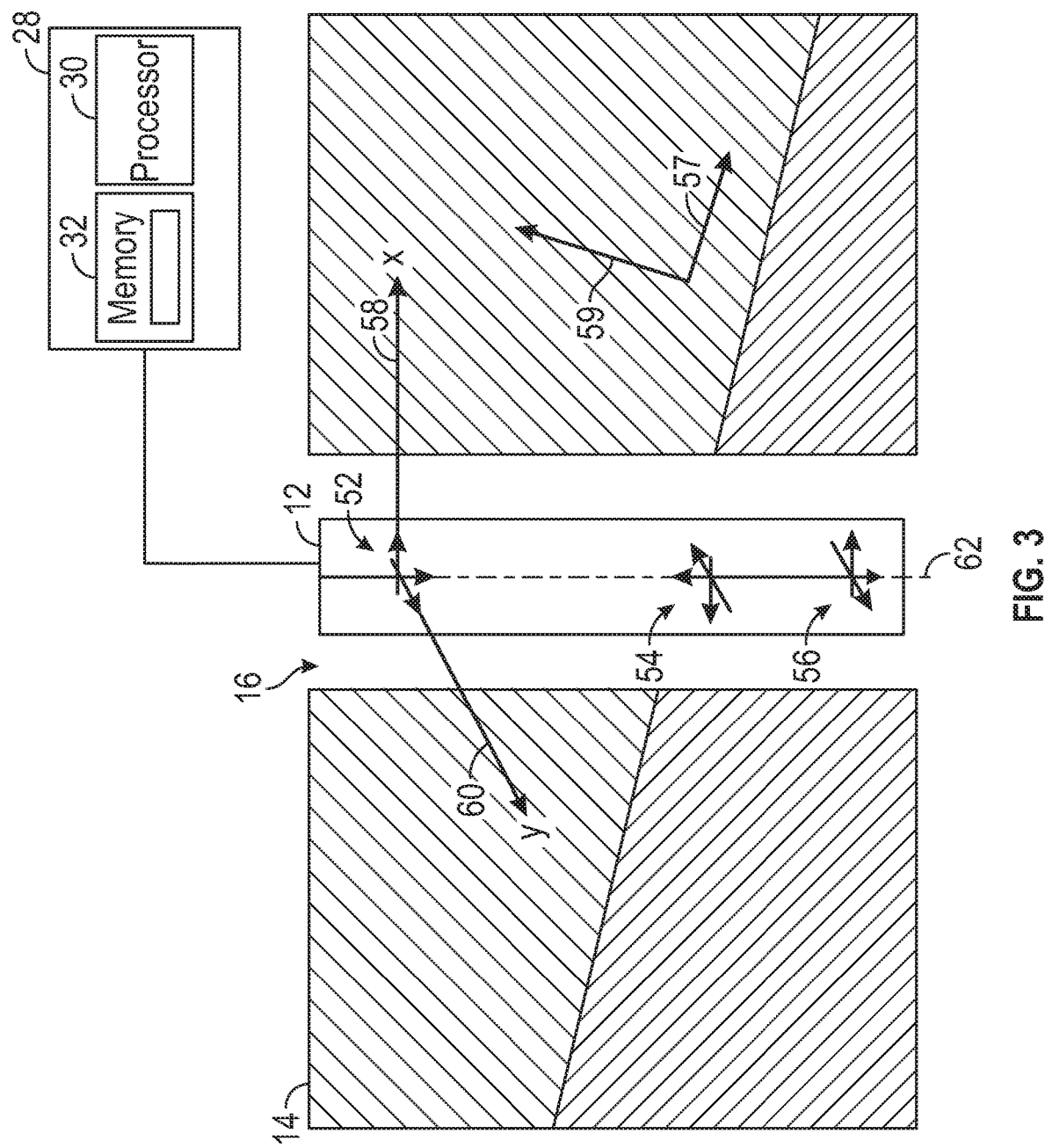
FIG. 3 is a schematic diagram of a downhole multi-axial array that may be used to obtain EM measurements, in accordance with aspects of the present disclosure.

With the foregoing in mind, FIG. 3 shows an illustrated embodiment an EM well logging tool 12 that is a multi-axial EM tool (e.g., the Rt Scanner tool by Schlumberger Technology Corporation) with mutually orthogonal and collocated transmitter and receiver coils. As shown in the illustrated embodiment, the EM well logging tool 12 includes three transmitters 52, three first receivers 54 (e.g., balancing receivers), and three second receivers 56 (e.g., main receivers). Generally speaking, the three transmitters 52 induce electric eddy current in the formation that flow parallel to orthogonal planes oriented with their normals in the X (e.g., along the axis 58), Y (e.g., along the axis 60), and Z directions (e.g., along the axis 62), which are defined by the directions of the magnetic dipole moments of each of the three transmitter coils. As such, the EM well logging tool 12 shown in FIG. 3 may measure all nine orthogonal couplings to determine formation resistivity and resistivity anisotropy as well as formation dip. While the illustrated embodiment of the EM well logging tool 12 is a tri-axial EM tool (e.g., each receiver of the receivers 56 shown in FIG. 3 are along axis 58, axis 60, and axis 62), the number of axes that include receivers is not limited to three, but maybe two or more.

The illustrated example of the EM well logging tool 12 is shown communicatively coupled to the data processing system 28. As discussed herein, the EM well logging tool 12 (e.g., multi-axial well logging tool) may obtain measurements within a wellbore 16 of the geological formation 14. The processor 30 of the data processing system 28 may receive these measurements. The memory 32 may store information such as control software, look up tables, configuration data, etc. Moreover, the memory 32 may store information such as the anisotropic formation model and the cost function as described in more detail herein. The memory 32 may include a volatile memory, such as random access memory (RAM), and/or a nonvolatile memory, such as read-only memory (ROM). The memory 32 may store a variety of information and may be used for various purposes. For example, the memory 32 may store processor-executable instructions including firmware or software for the processor 30 to execute. In some embodiments, the memory 32 is a tangible, non-transitory, machine-readable-medium that may store machine-readable instructions for the processor 30 to execute. The memory 32 may include ROM, flash memory, a hard drive, or any other suitable optical, magnetic, or solid-state storage medium, or a combination thereof. The memory 32 may store data, instructions, and any other suitable data.

Figure 4:
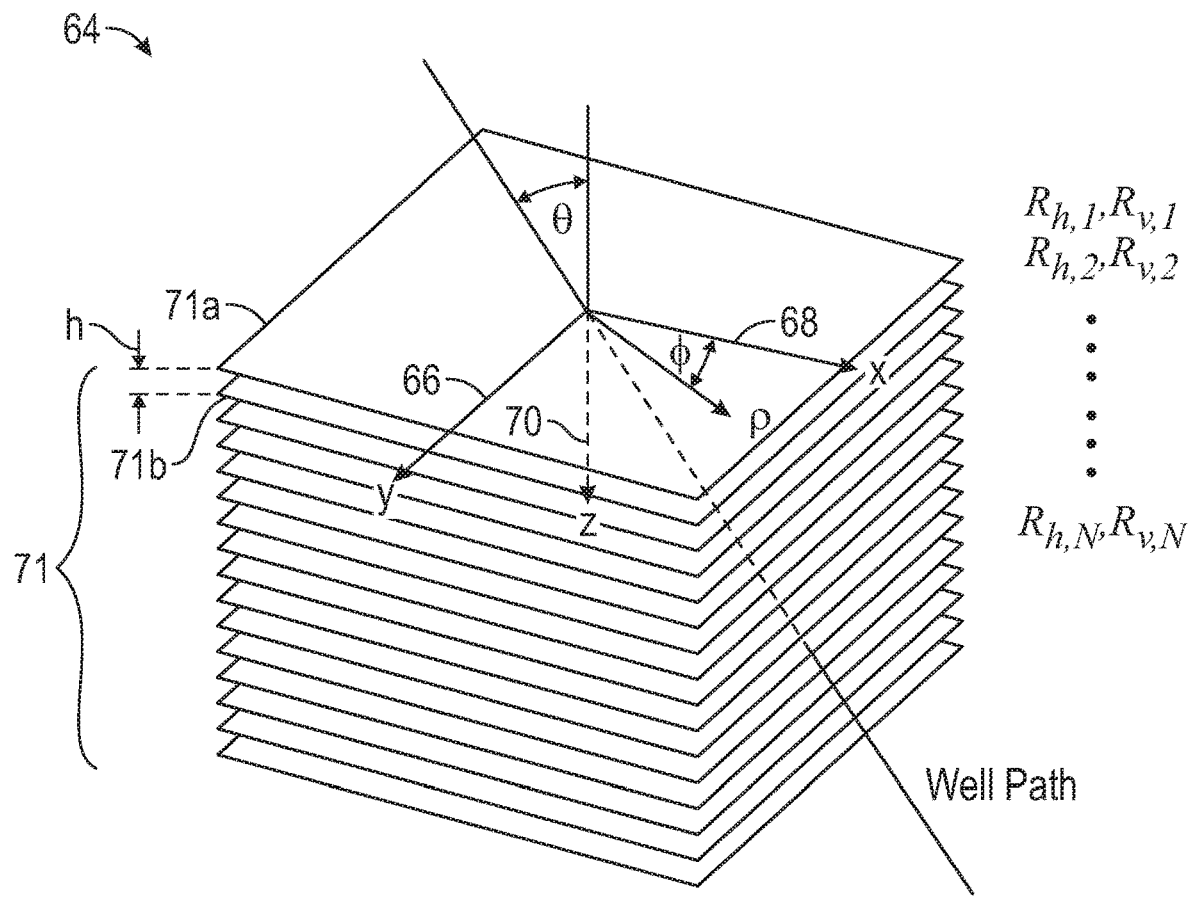
FIG. 4 is a schematic diagram of a layered formation model that may be used to ascertain horizontal resistivity values, vertical resistivity values, dip and azimuth in accordance with aspects of the present disclosure.

As discussed herein, one existing formation model for determining resistivity and resistivity anisotropy is the 1D model, where the geological formation is assumed to be dipping and planarly layered. FIG. 4 shows an illustration of a layered formation model 64, which may represent a 1D formation model adopted in the inversion. In general, the layered formation model 64 assumes that the horizontal resistivity $R_h$ and the vertical resistivity $R_v$ are invariant in the y-direction (e.g., along axis 66) and the x-direction (e.g., along axis 68), but may vary in the z-direction (e.g., along axis 70). Angles θ and φ are the relative dip and azimuth of the well path. The varying horizontal resistivity $R_h$ and vertical resistivity $R_v$ along the axis 66 is illustrated as multiple planes 71. In some embodiments, each plane of the multiple planes 71 may be the top or bottom interface of a pixel or a layer of the formation model. For example, in the illustrated embodiment of the layered formation model 64 shown in FIG. 4, plane 71a is at a first position along the axis 70 and plane 71b is at a second position along the axis 70. Moreover, the pixel between the plane 71a and the plane 71b is assumed to have a constant vertical resistivity and a constant horizontal resitivity. The same is true with all other pixels in the model. It is worthy of note that the horizontal resistivity $R_h$ and the vertical resistivity $R_v$ may change from pixel to pixel.

In some embodiments, the formation is subdivided into multiple layers or pixels each having an equal thickness (e.g., 1 in, 2 in, 3 in, 6 in, 12 in, etc.). In one embodiment, the subdivision of the multiple layers is along the well path, and the layer thickness along the well path may be referred to as the apparent thickness. Each of these layers may be represented as a pixel, although illustrated as an infinitely extending slab. It is worth noting that the formation is described as a collection of equal-thickness slabs regardless of actual bed boundaries in the inversion. It is the collective behavior, or the image created by all layers or pixels that reveals where the bed boundaries are and what their resistivities are. This pixel inversion is in contrast to the parametric inversion as aforementioned, where not only physical but also geometric properties have to be used to depict the formation. The mixed use of physical and geometric terms in a parametric inversion can make the inversion susceptible to data noise. The premise of a pixel inversion is that in reality, there does not exist such a distinct and sharp jump in resistivity that can be described accurately by a square-wave like function without incurring any error.

Figure 5:
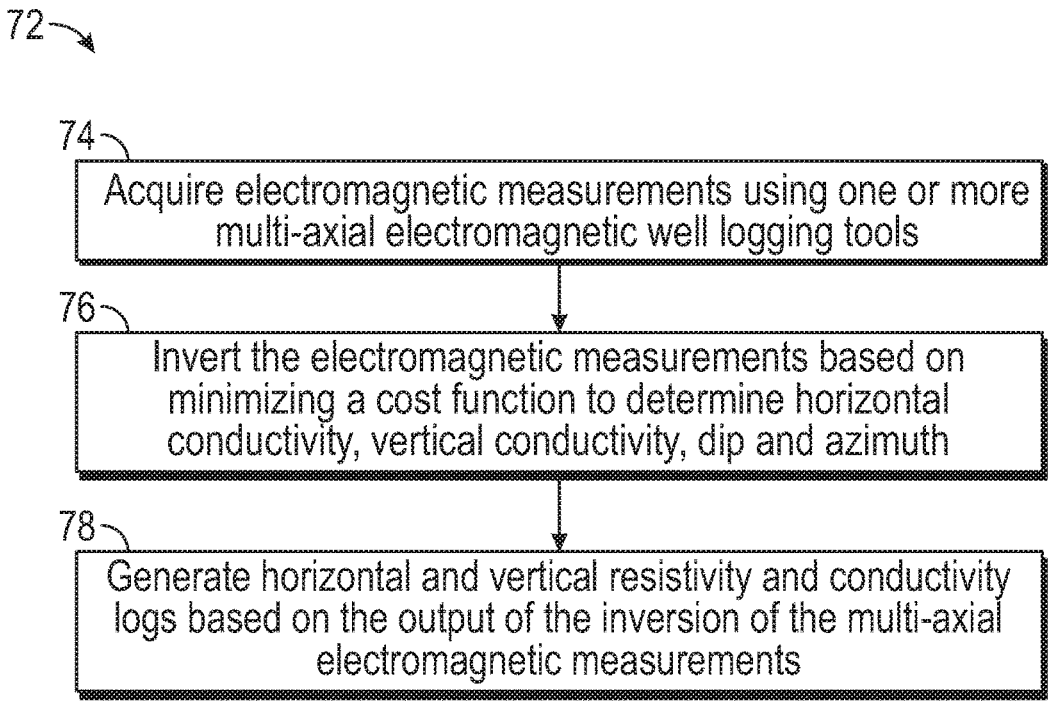
FIG. 5 is a flowchart of a process to determine the horizontal resistivity values and the vertical resistivity values using one or more electromagnetic well logging tools, in accordance with aspects of the present disclosure.

To help illustrate the above discussion, an example process 72 for determining physical properties associated with a geological formation in accordance with present disclosure is described in FIG. 5. Generally, the process 72 includes obtaining (process block 74) multi-axial EM measurements associated with a geological formation with one or more multi-axial EM well logging tools, such as the EM well logging tool 12 of FIG. 3. In some embodiments, process block 74 may include positioning the one or more multi-axial EM well logging tools into one or more wellbores within a geological formation. In some embodiments the multi-axial EM measurements may be performed in real-time, such as by a data processing system 28 communicatively coupled to the EM well logging tool 12 to acquire multi-axial EM measurements.

The process 72 also includes inverting (process block 76) the multi-axial EM measurements based on an anisotropic resistivity formation model by minimizing a cost function. In some embodiments, the anisotropic resistivity model may assume that the horizontal resistivity $R_h$ and the vertical resistivity $R_v$ varies in one direction, as discussed above. The cost function may include a data misfit term, an entropy term, and a smoothness term, as discussed in more detail below. In some embodiments, one or more of the terms (e.g., the data misfit term, the entropy term, and the smoothness term) may be formulated based on the horizontal resistivities, the vertical resistivities, the dip, or the azimuth, or any combination thereof, as defined by the model. Further, the process 72 may also include generating (process block 78) at least one of horizontal resistivity values, vertical resistivity values, horizontal conductivity values, vertical resistivity values, dip values, azimuth values, a data misfit, or any combination thereof, based on the anisotropic resistivity formation model.

Although described in a particular order, which represents a particular embodiment, it should be noted that the process 72 may be performed in any suitable order. Additionally, embodiments of the process 72 may omit process blocks and/or include additional process blocks. Moreover, in some embodiments, the process 72 may be implemented at least in part by executing instructions stored in a tangible, non-transitory, computer-readable medium, such as memory 32 implemented in a data processing system 28, using processing circuitry, such as a processor 30 implemented in the data processing system 28.

As discussed herein, techniques of the present disclosure may include inverting EM well logging measurements using a cost function. In some embodiments, the cost function that the inversion minimizes may be given by:

$$\mathcal{L}(\sigma_h, \sigma_v, \theta, \phi) = \chi^2(\sigma_h, \sigma_v, \theta, \phi) - \gamma_P \mathcal{L}_P(\sigma_h, \sigma_v) + \gamma_S \mathcal{L}_S(\sigma_h, \sigma_v), \quad (1)$$

where:

$$\chi^2(\sigma_h, \sigma_v, \theta, \phi) = \quad (2)$$
$$\int_{-\infty}^{\infty} dz \sum_{p,j,k} \left\{ w_R^{p,j,k} \left[ \frac{d_R^{p,j,k}(z; \sigma_h, \sigma_v, \theta, \phi) - \hat{d}_R^{p,j,k}(z)}{\Delta_R^{p,j,k}} \right]^2 + w_X^{p,j,k} \left[ \frac{d_R^{p,j,k}(z; \sigma_h, \sigma_v, \theta, \phi) - \hat{d}_R^{p,j,k}(z)}{\Delta_R^{p,j,k}} \right]^2 \right\},$$

$$\mathcal{L}_P(\sigma_h, \sigma_v) = \quad (3)$$
$$-\int_{-\infty}^{\infty} dz \frac{\sigma_h(z)}{T_{\sigma_h}} \left[ \ln \frac{\sigma_h(z)}{\sigma_{h,P}(z)} - 1 \right] - \int_{-\infty}^{\infty} dz \frac{\sigma_v(z)}{T_{\sigma_v}} \left[ \ln \frac{\sigma_v(z)}{\sigma_{v,P}(z)} - 1 \right],$$

$$\mathcal{L}_S(\sigma_h, \sigma_v) = \mu_h \int_{-\infty}^{\infty} dz \left[ \frac{d\sigma_h(z)}{dz} \right]^2 + \mu_v \int_{-\infty}^{\infty} dz \left[ \frac{d\sigma_v(z)}{dz} \right]^2, \quad (4)$$

where $\sigma_h$ ($=1/R_h$) and $\sigma_v$ ($=1/R_v$) are horizontal and vertical conductivity of the formation and are to be determined in conjunction with formation dip $\theta$ and azimuth $\phi$ by minimizing the cost function $\mathcal{L}$. The cost function of Eqn. (1) generally includes three terms, which are represented by Eqn. (2), Eqn. (3), and Eqn. (4), and discussed in more detail below.

The first term, $\chi^2$ and referred to herein as the "data misfit term," on the right-hand side of Eqn. (1) is a measure of the difference between the simulated and the measured data, where $\hat{d}_R^{p,j,k}$ and $\hat{d}_X^{p,j,k}$ are the measured in-phase and quadrature components of the apparent conductivity, respectively; $\hat{d}_R^{p,j,k}$ and $\hat{d}_X^{p,j,k}$ are their respective counterparts from simulation. It should be noted that although in the current formulation, the data are assumed to be apparent conductivities, the data can also be measured voltages, or any other measurements that may be transformed from the measured voltages, e.g. phase shift and attenuation. Here, the indices p,j and k in the superscripts are for spacing and/or frequency, transmitter orientation and receiver orientation, respectively, with $p=1, \ldots, N_p, j=1, \ldots N_j$, and $k=1, \ldots N_k$. The simulated data $\hat{d}_R^{p,j,k}$ and $\hat{d}_X^{p,j,k}$ as well as the Jacobian are obtained rapidly with a fast forward solver for the 1D formation. $\Delta_R^{p,j,k}$ and $\Delta_X^{p,j,k}$ are scaling factors. In the current implementation, they are given by:

$$\Delta_R^{p,j,k}(z) = \left\{ \frac{1}{N_j N_k} \sum_{j,k} \left[ \hat{d}_R^{p,j,k}(z) \right]^2 \right\}^{\frac{1}{2}} \quad (5)$$

$$\Delta_X^{p,j,k}(z) = \left\{ \frac{1}{N_j N_k} \sum_{j,k} \left[ \hat{d}_X^{p,j,k}(z) \right]^2 \right\}^{\frac{1}{2}} \quad (6)$$

The second term, $\mathcal{L}_P$, and referred to herein as the "entropy term," of Eqn. (1) is given in Eqn. (3), which describes the entropy of the horizontal and vertical conductivity models. Here, $T\sigma_h$ and $T\sigma_v$, are averages of $\sigma_h$ and $\sigma_v$; $\sigma_{h,P}$ and $\sigma_{v,P}$ are prior models for $\sigma_h$ and $\sigma_v$. It should be noticed that, at least in some implementations of the disclosure, it is expedient to let $T\sigma_h = \sigma_{h,P}$ and $T\sigma_v = \sigma_{v,P}$ in the inversion. The use of the maximum entropy term drives the solution as close to the prior model as possible, whereby making the iterative process more stable.

The third term, $\mathcal{L}_S$ and referred to herein as the "smoothness term," of Eqn. (1) is given in Eqn. (4), is configured to cause the inversion to preferentially look for a smooth model to avoid being trapped in a local minimum. The terms $\mu_h$ and $\mu_v$ (e.g., as discussed in more detail with to Eqn. 35), in Eqn. (4) may be determined by means of the data sensitivity to $\sigma_h$ and $\sigma_v$, in order to retain high resolution information of $\sigma_v$. It should be understood that although the first derivative is used for the smoothness term, the inversion can use other properties of the model for the same effect. In one embodiment, the variance of the model can be used in place of the first derivative. In another embodiment, the second derivative can also be used to impose the smoothness on the model.

For numerical implementations, the cost function of Eqn. (1) may be discretized, yielding:

$$\mathcal{L}(m_h, m_v, \theta, \phi) = \chi^2(m_h, m_v, \theta, \phi) - \gamma_P \mathcal{L}_P(m_h, m_v) + \gamma_S \mathcal{L}_S(m_h, m_v) \quad (7)$$

where $m_v$ and $m_h$ are two N-dimensional vectors consisting of horizontal and vertical conductivities of all pixels in the solution domain. Here, it is assumed that the solution domain is first truncated into a depth zone of finite extent, which is then subdivided into N pixels with equal thickness, as shown in FIG. 4. The two vectors are given by:

$$m_h(\sigma_{h,1}, \sigma_{h,2}, \ldots \sigma_{h,N})^T \quad (8)$$

$$m_v = (\sigma_{v,1}, \sigma_{v,2}, \ldots, \sigma_{v,N})^T \quad (9)$$

In this embodiment, the subscript T designates the operation of matrix transposition. The discrete forms of the three terms in Eqn. (7) are respectively:

$$\chi^2(m_h, m_v, \theta, \phi) = \|\overline{W}_R[d_R(m_h, m_v, \theta, \phi) - d_R^{OBS}]\|_2^2 + \|\overline{W}_X[d_X(m_h, m_v, \theta, \phi) - d_X^{OBS}]\|_2^2 \quad (10)$$

$$\mathcal{L}_P(m_h, m_v) = -\frac{m_h^T}{\sigma_{h,P}} \left( \ln \frac{m_h}{\sigma_{h,P}} - 1 \right) - \frac{m_v^T}{\sigma_{v,P}} \left( \ln \frac{m_v}{\sigma_{v,P}} - 1 \right), \quad (11)$$

$$\mathcal{L}_S(m_h, m_v) = \mu_h \|\overline{D} m_h\|_2^2 + \mu_v \|\overline{D} m_v\|_2^2 \quad (12)$$

In the above, $d_R^{OBS}$ and $d_X^{OBS}$ are the real and imaginary parts of measured apparent conductivities acquired at M depth points, $$d_R^{OBS} = (d_{R,1}^{OBS} d_{R,2}^{OBS} \ldots d_{R,M}^{OBS})^T \quad (13)$$

$$d_X^{OBS} = (d_{X,1}^{OBS} d_{X,2}^{OBS} \ldots d_{X,M}^{OBS})^T \quad (14)$$

where, $M=N_z N_p N_j N_k$ with $N_z$ being the number of the depth points. $d_R$ and $d_X$ are the real and imaginary parts of simulated apparent conductivities at the same depth points, $$d_R(m_\sigma, m_\epsilon) = [d_{R,1}(m_\sigma, m_\epsilon) d_{R,2}(m_\sigma, m_\epsilon) \ldots d_{R,M}(m_\sigma, m_\epsilon)]^T, \quad (15)$$

$$d_X(m_\sigma, m_\epsilon) = [d_{X,1}(m_\sigma, m_\epsilon) d_{X,2}(m_\sigma, m_\epsilon) \ldots d_{X,M}(m_\sigma, m_\epsilon)]^T \quad (16)$$

Matrices $\overline{W}_R$ and $\overline{W}_X$ are diagonal that may contain the inverses of standard deviations of the noises of real and imaginary apparent conductivities, $$\overline{W}_R = \text{diag}(\Delta_{R,1}^{-1} \Delta_{R,2}^{-1} \ldots \Delta_{R,M}^{-1}), \quad (17)$$

$$\overline{W}_X = \text{diag}(\Delta_{X,1}^{-1} \Delta_{X,2}^{-1} \ldots \Delta_{X,M}^{-1}), \quad (18)$$

in Eqn. (10):

$$\ln\frac{m_h}{\sigma_{h,P}} = \left(\ln\frac{\sigma_{h,1}}{\sigma_{h,P}} \ln\frac{\sigma_{h,2}}{\sigma_{h,P}} \ldots \ln\frac{\sigma_{h,N}}{\sigma_{h,P}}\right)^T, \quad (19)$$

$$\ln\frac{m_v}{\sigma_{v,P}} = \left(\ln\frac{\sigma_{v,1}}{\sigma_{v,P}} \ln\frac{\sigma_{v,2}}{\sigma_{v,P}} \ldots \ln\frac{\sigma_{v,N}}{\sigma_{v,P}}\right)^T, \quad (20)$$

The vector $l \in R^{N \times 1}$ in Eqn. (11) is a constant vector, $l = (1\ 1\ \ldots\ 1)^T$. Matrix $\overline{D} \in R^{(N-1) \times N}$ in Eqn. (12) is a difference operator, such as:

$$\overline{D} = \begin{pmatrix} -1 & 1 & & \\ & -1 & 1 & \\ & & & \\ & & -1 & 1 \end{pmatrix} \quad (21)$$

In some embodiments, a Gauss-Newton method may be used to reduce (e.g., minimize) the cost function in Eqn. (6) to find a solution (e.g., a best-fit solution) for horizontal conductivity $M_h$ and vertical conductivity $m_v$. For the sake of conciseness of formulation, the following notations may be used:

$$m \equiv (m_h^T\ m_v^T\ \theta\ \phi) \quad (22)$$

$$d \equiv (d_R^T\ d_X^T)^T \quad (23)$$

$$d^{OBS} \equiv [(d_R^{OBS})^T\ (d_X^{OBS})^T]^T \quad (24)$$

$$\overline{W}_D = \begin{pmatrix} W_R & \overline{0} \\ \overline{0} & W_X \end{pmatrix}. \quad (25)$$

In Eqn. (25), $\overline{0} \in R^{M \times M}$ is a zero matrix. When the current iterative step is l, the solution at this step is:

$$m_l = m_{l-1} + v_{l-1} q_{l-1}, \quad (26)$$

where $q_{l-1}$ is the Newton search direction; is a step length to reduce the effect of approximation error caused by the quadratic approximation at the current step. The search vector may be given by $$q_{l-1} = -\overline{G}_{l-1}^{-1} g_{l-1}, \quad (27)$$

where $g_{l-1}$ is the gradient of the cost function and $\overline{G}_{l-1}$ is its Hessian. The gradient of the cost function and the Hessian may be represented as:

$$g_{l-1} = J_{l-1} \overline{W}_D \overline{W}_D (d_{l-1} - d^{OBS}) + \gamma_P^{l-1} \nabla \mathcal{L}_P(m_{l-1}) + \gamma_S^{l-1} \nabla \mathcal{L}_S(m_{l-1}), \quad (28)$$

$$\overline{G}_{l-1} = \overline{J}_{l-1} \overline{W}_D \overline{W}_D J_{l-1} + \gamma_P^{l-1} \nabla\nabla \mathcal{L}_P(m_{l-1}) + \gamma_S^{l-1} \nabla\nabla \mathcal{L}_S(m_{l-1}). \quad (29)$$

In the above two equations, $d_{l-1}$ is the simulated data corresponding to the model $m_{l-1}$ obtained at the previous step; $J_{l-1}$ is the Jacobian of the data term $\chi^2$ of the cost function, evaluated at $m = m_{l-1} \ldots \nabla \mathcal{L}_P$ and $\nabla \mathcal{L}_S$ are the gradients of the maximum entropy and the smoothness terms in Eqn. (6), respectively. $\nabla\nabla \mathcal{L}_P$ and $\nabla\nabla \mathcal{L}_S$ are their Hessians, respectively. A form of these four gradients and Hessians may be derived from $\mathcal{L}_{S,P}$ and $\mathcal{L}_{S,P}$ in Eqs. (10) and (11). The two regularization terms, $\gamma_P$ and $\gamma_P$, may be dynamically adjusted with $\chi^2$ during the iteration such that:

$$\gamma_P^{l-1} = \delta_P \chi^2(m_{l-1}), \quad (30)$$

$$\gamma_S^{l-1} = \delta_S \chi^2(m_{l-1}), \quad (31)$$

where $\chi^2(m_{l-1})$ is the data misfit evaluated at $m = m_{l-1}$, the model obtained at the previous step. Numerical experiments show that setting $\delta_P$ and $\delta_S$ to 1 is an appropriate choice for both synthetic and field data processing. Once the search direction is determined from Eqn. (27), a linear search follows to determine the step length $v_{l-1}$.

A Jacobian $\overline{J}_{l-1} \in R^{2M \times 2N}$ J contains the first derivatives of $d_R$ and $d_X$ with respect horizontal and vertical conductivies as well as dip and azimuth, evaluated at $m = m_{l-1}$. The Jacobian may be represented by:

$$\overline{J}_{l-1} = \begin{pmatrix} \frac{\partial d_R}{\partial m_h} & \frac{\partial d_R}{\partial m_v} & \frac{\partial d_R}{\partial \theta} & \frac{\partial d_R}{\partial \phi} \\ \frac{\partial d_X}{\partial m_h} & \frac{\partial d_X}{\partial m_v} & \frac{\partial d_X}{\partial \theta} & \frac{\partial d_X}{\partial \phi} \end{pmatrix}\Bigg|_{m=m_{l-1}} \quad (32)$$

Where:

$$\frac{\partial d_\eta}{\partial x} = \begin{cases} \begin{pmatrix} \frac{\partial d_{\eta,1}}{\partial x_1} & \frac{\partial d_{\eta,1}}{\partial x_2} & \cdots & \frac{\partial d_{\eta,1}}{\partial x_N} \\ \frac{\partial d_{\eta,2}}{\partial x_1} & \frac{\partial d_{\eta,2}}{\partial x_2} & \cdots & \frac{\partial d_{\eta,2}}{\partial x_N} \\ \vdots & \vdots & \ddots & \vdots \\ \frac{\partial d_{\eta,M}}{\partial x_1} & \frac{\partial d_{\eta,M}}{\partial x_2} & \cdots & \frac{\partial d_{\eta,M}}{\partial x_N} \end{pmatrix} \end{cases}, \eta = R, X; x = m_h, m_v \quad (33)$$

$$\frac{\partial d_\eta}{\partial x} = \begin{pmatrix} \frac{\partial d_{\eta,1}}{\partial x} \\ \frac{\partial d_{\eta,2}}{\partial x} \\ \vdots \\ \frac{\partial d_{\eta,M}}{\partial x} \end{pmatrix}, \eta = R, X; x = \theta, \phi \quad (34)$$

In some embodiments, the derivatives of $d_R$ and $d_X$ with respect to conductivities of pixels may be computed with an analytical approach or using a finite difference approximation, the former of which may expedite the inversion.

The two additional terms $\mu_h$ and $\mu_v$ in Eqn. (12) are used to account for the difference of data sensitivity between $\sigma_h$ and $\sigma_v$. At least in some instances, the data sensitivity to $\sigma_h$ is larger than that to $\sigma_v$. As a result, using the same regularization term $\gamma_s$ for the two sub-terms of the smoothness term $\mathcal{L}_s$ can cause an over-smoothed a, with limited resolution. This undesirable effect is alleviated by using the two relaxation factors $\mu_h$ and $\mu_v$, defined such that the sensitivity to a given term from the smoothness term $\mathcal{L}_s$ is proportional to that from the data term $\chi^2$ in Eqn. (1). To this end, the horizontal relaxation factor $\mu_h$ for horizontal conductivity $\sigma_h$ is set to 1, $\mu_h^{l-1} = 1$. The vertical relaxation factor $\mu_v$ for vertical conductivity $\alpha_v$ is given by:

$$\mu_v^{l-1} = \left(\frac{tr(\nabla\nabla \mathcal{L}_{S,h}^{l-1})}{tr(\nabla\nabla \mathcal{L}_{S,v}^{l-1})}\right) \Big/ \left(\frac{tr(\nabla\nabla \chi_h^{2,l-1})}{tr(\nabla\nabla \chi_v^{2,l-1})}\right) \quad (35)$$

At least in some embodiments, the vertical relaxation factor may be set to 1 and the horizontal relaxation factor may be an equation generally similar to Eqn. (35).

In the above, $\mathcal{L}_{S,h}^{l-1}$ and $\mathcal{L}_{S,v}^{l-1}$ are the first and second term of $\mathcal{L}_S$ respectively, evaluated at $m=m_{l-1}$. $\nabla\nabla\mathcal{L}_{S,h}^{l-1}$ and $\nabla\nabla\mathcal{L}_{S,v}^{l-1}$ are the Hessians of $\mathcal{L}_S$ with respect to $\sigma_h$ and $\sigma_v$, respectively. $\nabla\nabla\chi_h^{2,l-1}$ and $\nabla\nabla\chi_v^{2,l-1}$ are the Hessians of the data term $\chi^2$ with respect to $\sigma_h$ and $\sigma_v$, respectively. The four Hessians are evaluated at $m=m_{l-1}$. The operator "tr( )" in Eqn. (35) gives the trace of a matrix. A rigorous computation of the two Hessian matrices of the data term can be prohibitively expensive. Therefore, the following approximations for the two Hessians are used instead:

$$\nabla\nabla\chi_h^{2,l-1} \approx \overline{J}_{l-1,h}^T \overline{W}_D^T \overline{W}_D \overline{J}_{l-1,h} \tag{36}$$

$$\nabla\nabla\chi_v^{2,l-1} \approx \overline{J}_{l-1,v}^T \overline{W}_D^T \overline{W}_D \overline{J}_{l-1,v} \tag{37}$$

Where:

$$\overline{J}_{l-1,\xi} = \begin{pmatrix} \frac{\partial d_R}{\partial m_\xi} \\ \frac{\partial d_X}{\partial m_\xi} \end{pmatrix}\Bigg|_{m=m_{l-1}}, \xi = h, v \tag{38}$$

The stopping criteria for the inversion are $\chi^2 < \chi_{tol}$ and $l > l_{max}$, where $l$ is the index for iteration step. $\chi_{tol}$ is the number of degree of freedom, $\chi_{tol}=2M$ if all data are independent random variables and the scaling factors $\Delta_R$ and $\Delta_X$ are the standard deviation of in-phase and quadrature components of apparent conductivity. In the current implementation, $\chi_{tol}$ is set to a small positive number. In the inversion, $l_{max}$, the maximum number of iterations, is set to 30.

Figure 6:
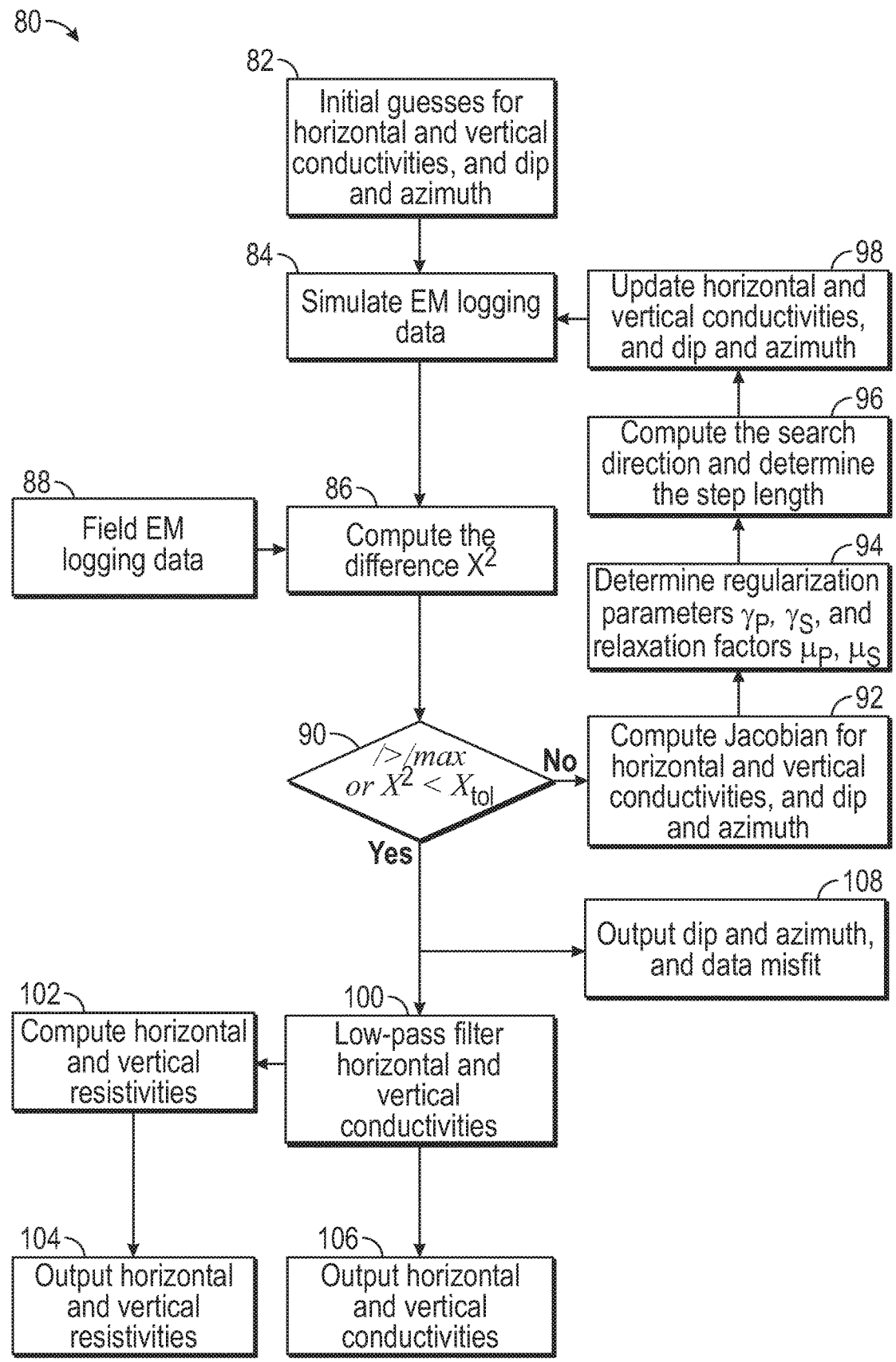
FIG. 6 is a flowchart of an inversion to determine the horizontal resistivity values, the vertical resistivity values, dip values, and azimuth values, in accordance with aspects of the present disclosure.

To help illustrate the above discussion, an example process 80 for determining horizontal resistivity, vertical resistivity, dip and azimuth in accordance with present disclosure is described in FIG. 6. Generally, the process 80 includes providing initial guesses for horizontal resistivity, vertical resistivity, dip and azimuth (process block 82), simulating EM data (process block 84), computing difference in $\chi^2$ (process block 86) based on received field EM data 88, and determining whether the inversion meets the stopping criteria (process block 90). The process 80 includes computing a Jacobian for horizontal conductivity or resistivity, vertical conductivity or resistivity, dip, azimuth, or any combination thereof, and dip and azimuth (process block 92) when the inversion does not meet the stopping criteria, determining a regularization term (e.g., $\gamma_S$ and $\gamma_P$) and/or relaxation factors (e.g., $\mu_S$ and $\mu_P$) (process block 94), computing a search direction and determining a step length (process block 96), and updating the horizontal conductivity or resistivity, vertical conductivity or resistivity, dip, azimuth, or any combination thereof, and dip and azimuth, (process block 98) and continuing with process block 84.

When the inversion does meet the stopping criteria, the process 80 includes applying a low-pass filter to the horizontal and vertical conductivities 100, computing horizontal and vertical resistivities from filtered horizontal and vertical conductivities (process block 102) to output horizontal and vertical resistivities 104, outputting the horizontal and vertical conductivities 106, and outputting the dip and azimuth, and data misfit 108.

Although described in a particular order, which represents a particular embodiment, it should be noted that the process 80 may be performed in any suitable order. Additionally, embodiments of the process 80 may omit process blocks and/or include additional process blocks. Moreover, in some embodiments, the process 80 may be implemented at least in part by executing instructions stored in a tangible, non-transitory, computer-readable medium, such as memory 32 implemented in a data processing system 28, using processing circuitry, such as a processor 30 implemented in the data processing system 28.

In some embodiments, some variants can be derived from the formulation in the above to further enhance the performance of the inversion. For instance, instead of inverting for $\sigma_h$ and $\sigma_v$, the logarithms of $\sigma_h$ and $\sigma_v$ may be inverted. As such, the vectors $m_h$ and $m_v$ become:

$$m_h = (\ln \sigma_{h,1}, \ln \sigma_{h,2}, \ldots, \ln \sigma_{h,N})^T \tag{39}$$

$$m_v = (\ln \sigma_{v,1}, \ln \sigma_{v,2}, \ldots, \ln \sigma_{v,N})^T \tag{40}$$

To accommodate the transforms, the maximum entropy term (e.g., as shown in Eqn. 3) may be modified to:

$$\mathcal{L}_P(\sigma_h, \sigma_v) = -\int_{-\infty}^{\infty} dz \frac{\ln\sigma_h(z) + \gamma_{\sigma_h}}{\ln T_{\sigma_h} + \gamma_{\sigma_h}} \left[\ln\frac{\ln\sigma_h(z) + \gamma_{\sigma_h}}{\ln\sigma_{h,P}(z) + \gamma_{\sigma_h}} - 1\right] - \int_{-\infty}^{\infty} dz \frac{\ln\sigma_v(z) + \gamma_{\sigma_v}}{\ln T_{\sigma_v} + \gamma_{\sigma_v}} \left[\ln\frac{\ln\sigma_v(z) + \gamma_{\sigma_v}}{\ln\sigma_{v,P}(z) + \gamma_{\sigma_v}} - 1\right] \tag{41}$$

where $\gamma_{\sigma_h}$ and $\gamma_{\sigma_v}$ are two positive numbers to prevent the denominators from being vanishingly small. Accordingly, the smoothness term (e.g., as shown in Eqn. 4) can be modified to:

$$\mathcal{L}_S(\sigma_h, \sigma_v) = \int_{-\infty}^{\infty} dz \left[\frac{d\ln\sigma_h(z)}{dz}\right]^2 + \int dz \left[\frac{d\ln\sigma_v(z)}{dz}\right]^2. \tag{42}$$

In some embodiments, $\mu$ and $\nu$ may be inverted for, and the transforms of an and a, may be represented as:

$$\mu = \sigma_v \tag{43}$$

$$\nu = \sigma_h - \sigma_v \tag{44}$$

Given a datum $d\eta$, $\eta=R, X, d$ the derivatives with respect to the transformed variables may be represented as:

$$\frac{\partial d_\eta}{\partial \mu} = \frac{\partial d_\eta}{\partial \sigma_h} + \frac{\partial d_\eta}{\partial \sigma_v} \tag{45}$$

$$\frac{\partial d_\eta}{\partial \nu} = \frac{\partial d_\eta}{\partial \sigma_h} \tag{46}$$

If the condition $|\partial d_\eta/\partial \sigma_v| < |\partial d_\eta/\partial \sigma_h|$ holds true uniformly in the whole model, using the transforms of Eqns. (41) and (42) leads to a more balanced inverse problem than solving for an and a, directly. When $\mu$ and $\nu$ are used, the unknown vectors $m_h$ and $m_v$ are given by $$m_h = (\mu_1, \mu_2, \ldots, \mu_N)^T \tag{47}$$

$$m_v = (\nu_1, \nu_2, \ldots, \nu_N)^T \tag{48}$$

The method for the inversion for $\mu$ and $\nu$ is obtained by substituting $\sigma_h$ for $\mu$ and $\sigma_v$ for $\nu$ in Eqns. (1)-(38). As with $\sigma_h$ and $\sigma_v$, instead of inverting for $\mu$ and $\nu$ directly, one may choose to invert for the logarithms of $\mu$ and $\nu$, leading to the third variant of the invention. When the logarithms of $\mu$ and $\nu$ are used as unknowns, the two vectors $m_h$ and $m_v$ become:

$$m_h = (\ln \mu_1, \ln \mu_2, \ldots, \ln \mu_N)^T \tag{49}$$

$$m_v = \ln \nu_1, \ln \nu_2, \ldots, \ln \nu_N)^T \tag{50}$$

The maximum entropy and the smoothness terms for the logarithms of μ and ν may be found by substituting $\sigma_h$ for μ and $\sigma_v$ for ν in Eqns. (39)-(42).

To facilitate numerical implementations, if a depth zone to be processed is long, the zone is first subdivided into a number of short intervals. Then the inversion is run on each interval separately. The results of all intervals are combined to create a single output. In one implementation, each interval is set to 30 ft. with a transition zone of 25 ft. on each side. In case of any undesirable artifacts, $\sigma_h$ and $\sigma_v$ that are obtained at the last iteration can be low-pass filtered before being delivered as the final solution. A Gaussian filter with a standard deviation of 0.25 ft. is often used as the low pass filter. In addition to $\sigma_h$ and $\sigma_v$, horizontal and vertical resistivities $R_h$ and $R_v$ are also provided as a reciprocal of $\sigma_h$ and $\sigma_v$, respectively.

Numerical Results

FIGS. 7-9 represent example EM well logs obtained using the inversion process as discussed herein. As discussed further below, the inversion process of this disclosure is successful in a number of situations.

I. Chirp Formation Model

Figure 7A:
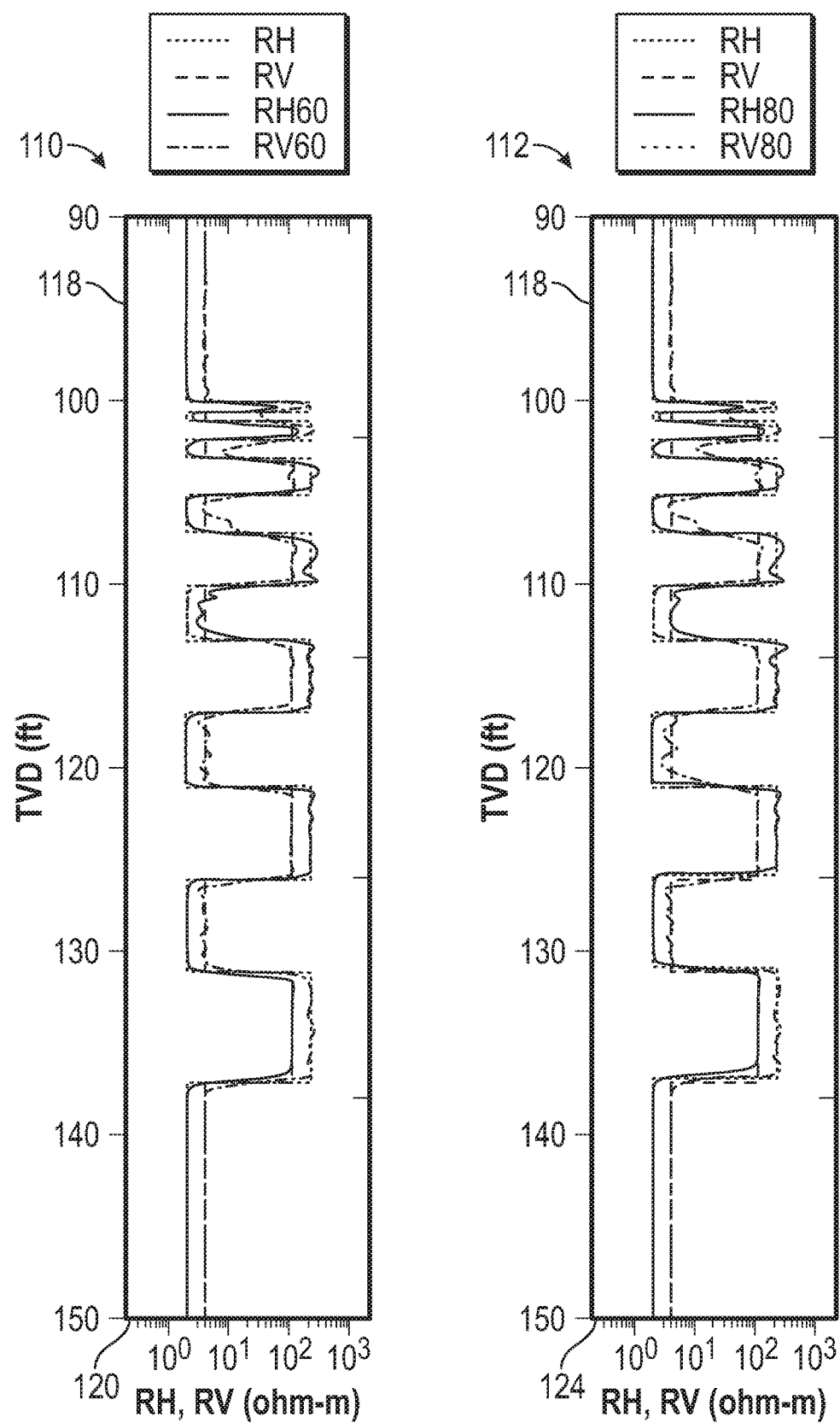
FIG. 7A is an example of horizontal resistivity logs and vertical resistivity logs determined with inversion in a chirp model, in accordance with aspects of the present disclosure.
Figure 7B:
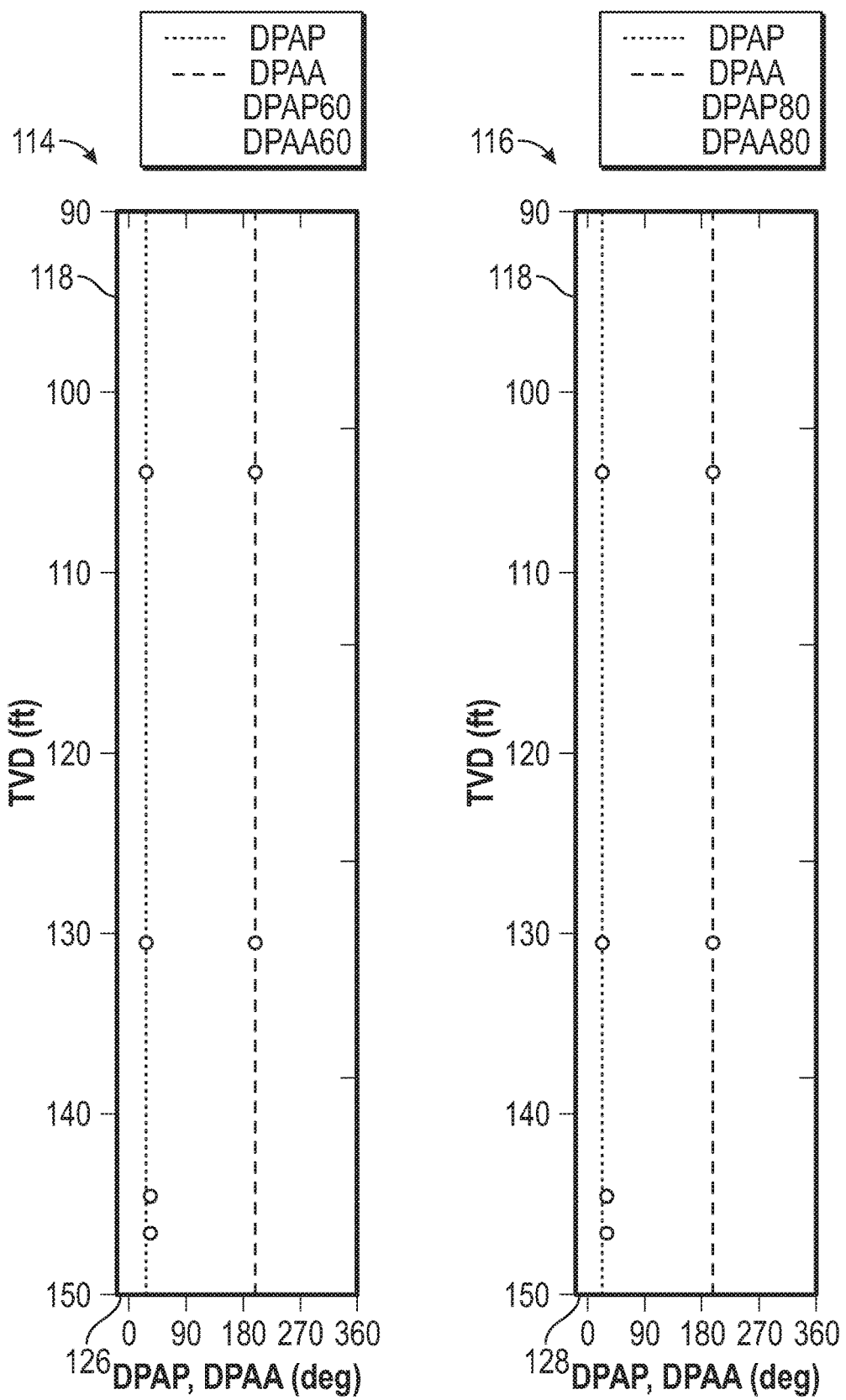
FIG. 7B is an example of dip logs and azimuth logs determined with inversion in a chirp model, in accordance with aspects of the present disclosure.

FIGS. 7A and 7B show panel 110, panel 112, panel 114, and panel 116 displaying well log data related to EM well logging measurements based on a chirp formation model. The well log data of each of the panels (e.g., the panel 110, the panel 112, the panel 114, and the panel 116) is depth (e.g., axis 118) versus a respective set of logs shown in axis 120, axis 124, axis 126, and axis 128. The panel 110 depicts depth versus horizontal and vertical resistivity logs obtained using the inversion process as discussed herein with one set of Rt Scanner data, the panel 112 depicts depth versus horizontal and vertical resistivity logs obtained with another set of Rt Scanner data, the panel 114 depicts depth versus dip and azimuth angles obtained with the first set of Rt Scanner data, and the panel 116 depicts depth versus dip and azimuth angles obtained with the second set of Rt Scanner data.

The chirp formation model includes an alternating sequence of resistive and conductive beds with gradually increasing thickness (e.g., depth along the axis 118) from top to bottom. In this example, the thickness of the first bed (e.g., at approximately 100 ft.) is 0.5 ft.; the thickness of the last bed (e.g., between approximately 130 and 140 ft.) is 6 ft. The others in between are 1, 2, 3, 4 and 5 ft., respectively from top to bottom. All the resistive beds of the panels 110 and 112 have a horizontal resistivity of 100 ohm·m, and a vertical resistivity of 200 oh·m·m, and all the conductive ones a horizontal resistivity of 2 ohm·m, and a vertical resistivity of 4 ohm·m. The anisotropic ratio is set to 2 across the whole model, namely, for all beds. The Rt Scanner data are simulated for the chirp model and then sent to the inversion as input data. The operation frequency is 26 kHz. Two sets of results are displayed on the true vertical depth (TVD) in FIG. 7. TVD is the projection of the measured depth, or the depth along the well path, onto the normal to the bedding planes. The first set of the results (e.g., the panels 110 and 114), containing RH60, RV60, DPAP60 and DPAA60, are obtained using 39 in and 54 in array data. The second set are with 54 in and 72 in array data, including RH80, RV80, DPAP80 and DPAA80. The square logs labeled RH and RV in panels 110 and 112 are the true horizontal and vertical resistivities. The two lines labeled DPAP and DPAA in panels 114 and 116 are the true dip and azimuth. In this case, the true relative dip and azimuth are 30 degrees and 200 degrees, respectively.

For the results in FIGS. 7A and 7B, the pixel height is set to 3 in in the inversion to resolve the thin layers on the top. The whole zone is subdivided into 2 intervals, with each interval being 30 ft. with a transition zone of 25 ft. on each of the two sides. The dip and azimuth obtained with the inversion are displayed at the middle of each interval. No filtering operation is applied to the inversion outputs. Apparently, all the beds, including two thin ones on the top, can be clearly seen on both of the inverted horizontal resistivity logs RH60 and RH80. The horizontal resistivity is slightly under-estimated in the 0.5 ft thin bed. On the inverted vertical resistivity logs RV60 and RV80, the two thin beds are still well resolved, although the readings in the shoulder beds are not as accurate as the horizontal resistivities.

II. Anisotropic Oklahoma Model.

An anisotropic Oklahoma model is generally made by adding anisotropy to an Oklahoma model that is often used to test the performance of inversion methods. One example of the anisotropic Oklahoma model is shown in Table 1. The positions of the bed boundaries are defined on TVD, or the depth along the normal to the bedding planes in the tool coordinates.

TABLE 1

The anisotropic Oklahoma model

| No. | z (ft) TVD | Rh (ohm · m) | Rv (ohm · m) |
|---|---|---|---|
| 1 | 0 | 1 | 1.0 |
| 2 | 17 | 10 | 100.0 |
| 3 | 25 | 0.4 | 0.4 |
| 4 | 29 | 3 | 15.0 |
| 5 | 32 | 0.9 | 1.8 |
| 6 | 39 | 20 | 40.0 |
| 7 | 43 | 0.7 | 1.4 |
| 8 | 49 | 90 | 90.0 |
| 9 | 52 | 6 | 6.0 |
| 10 | 57 | 120 | 120.0 |
| 11 | 64 | 4 | 4.0 |
| 12 | 82 | 150 | 300.0 |
| 13 | 90 | 40 | 200.0 |
| 14 | 97 | 1.5 | 3.0 |
| 15 | 107 | 100 | 200.0 |
| 16 | 111 | 18 | 18.0 |
| 17 | 116 | 100 | 500.0 |
| 18 | 119 | 1.5 | 1.5 |
| 19 | 123 | 7.5 | 75.0 |
| 20 | 127 | 0.9 | 1.8 |
| 21 | 131 | 2 | 2.0 |
| 22 | 136 | 10 | 20.0 |
| 23 | 139 | 1.8 | 1.8 |
| 24 | 141 | 20 | 40.0 |
| 25 | 143 | 7.5 | 7.5 |
| 26 | 145 | 15 | 75.0 |
| 27 | 157 | 0.7 | 1.4 |
| 28 | ∞ | 1.1 | 1.1 |

Figure 8A:
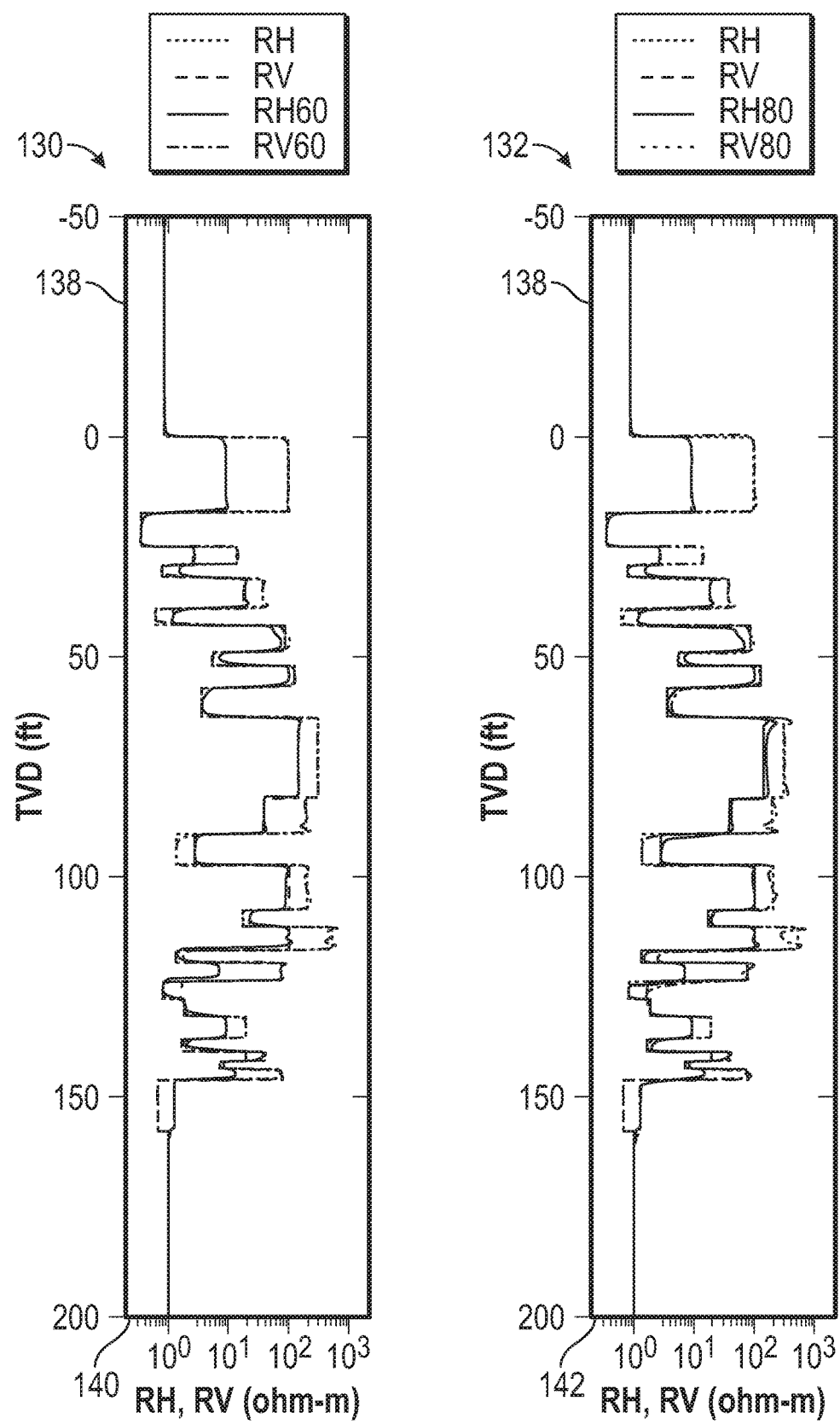
FIG. 8A is an example of horizontal resistivity logs and vertical resistivity logs determined with inversion in an anisotropic Oklahoma model of a relative dip of 30 degrees, in accordance with aspects of the present disclosure.
Figure 8B:
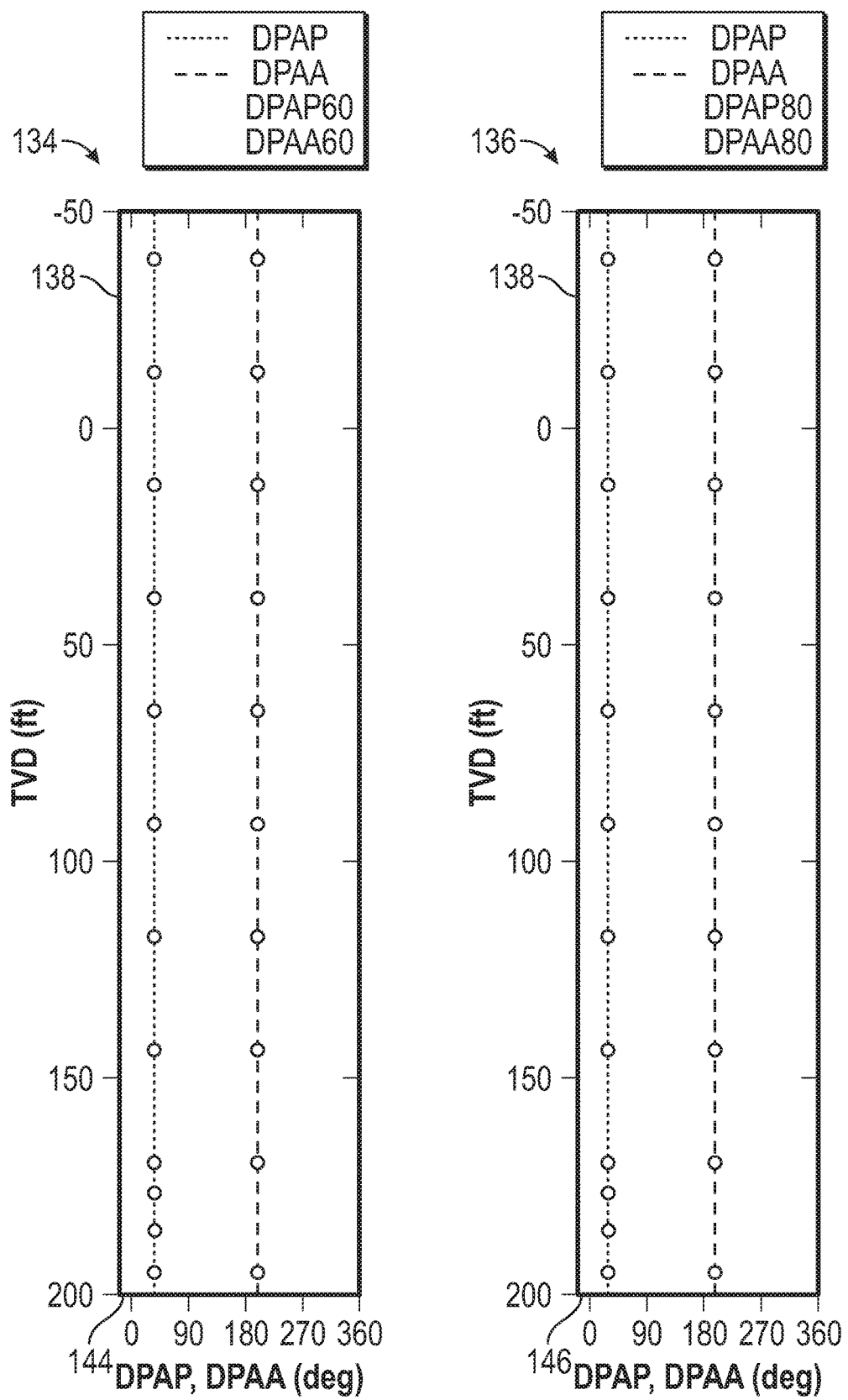
FIG. 8B is an example of dip logs and azimuth logs determined with inversion in an anisotropic Oklahoma model of a relative dip of 30 degrees, in accordance with aspects of the present disclosure.

FIGS. 8A and 8B show panel 130, panel 132, panel 134, and panel 136 displaying well log data related to EM well logging measurements based on the anisotropic Oklahoma formation model. The well log data of the panel 130, the panel 132, the panel 134, and the panel 136 is depth (e.g., axis 138) versus a respective set of logs shown in axis 140, axis 142, axis 144, and axis 146. The panel 130 depicts depth versus horizontal and vertical resistivity logs obtained using the inversion process as discussed herein with one set of Rt Scanner data, the panel 132 depicts depth versus horizontal and vertical resistivity logs obtained with another set of Rt Scanner data, the panel 134 depicts depth versus dip and azimuth angles obtained with the first set of Rt Scanner data, and the panel 136 depicts depth versus dip and azimuth angles obtained with the second set of Rt Scanner data.

In the example shown in FIGS. 8A and 8B, the true relative dip and azimuth of the model are 30 degrees and 200 degrees respectively. The Rt Scanner data are simulated for the true Oklahoma model and then sent to the inversion as input data. The operation frequency is 26 kHz. Two sets of results are displayed on TVD in FIG. 8. As with the case for the chirp model, the first set contains RH60, RV60, DPAP60 and DPAA60 obtained using the 39 in and 54 in array data. The second set are obtained with the 54 in and 72 in array data, including RH80, RV80, DPAP80 and DPAA80. The square logs labeled RH and RV in the panels 130 and 132 are the true horizontal and vertical resistivities. The two lines labeled as DPAP and DPAA in the panels 134 and 136 are the true dip and azimuth.

In the inversion, the pixel height is set to 3 in. The whole zone is subdivided into 9 intervals, with each interval being 30 ft. with a transition zone of 25 ft. on each of the two sides. The dip and azimuth obtained with the inversion are displayed at the middle of each interval. The inverted resistivities are filtered with a Gaussian filter of a standard deviation of 0.25 ft. before being output. Apparently, all the resistive beds, including two thin ones at the bottom at 139-145 ft., are well resolved on both inverted horizontal and resistivity logs. Comparatively, the accuracy of inverted horizontal resistivity RH60 and RH80 is better than that of the inverted vertical resistivities RV60 and RV80. This is particularly true for the thin conductive beds, for example, those at 50 ft., 118 ft. and 142 ft.

Figure 9A:
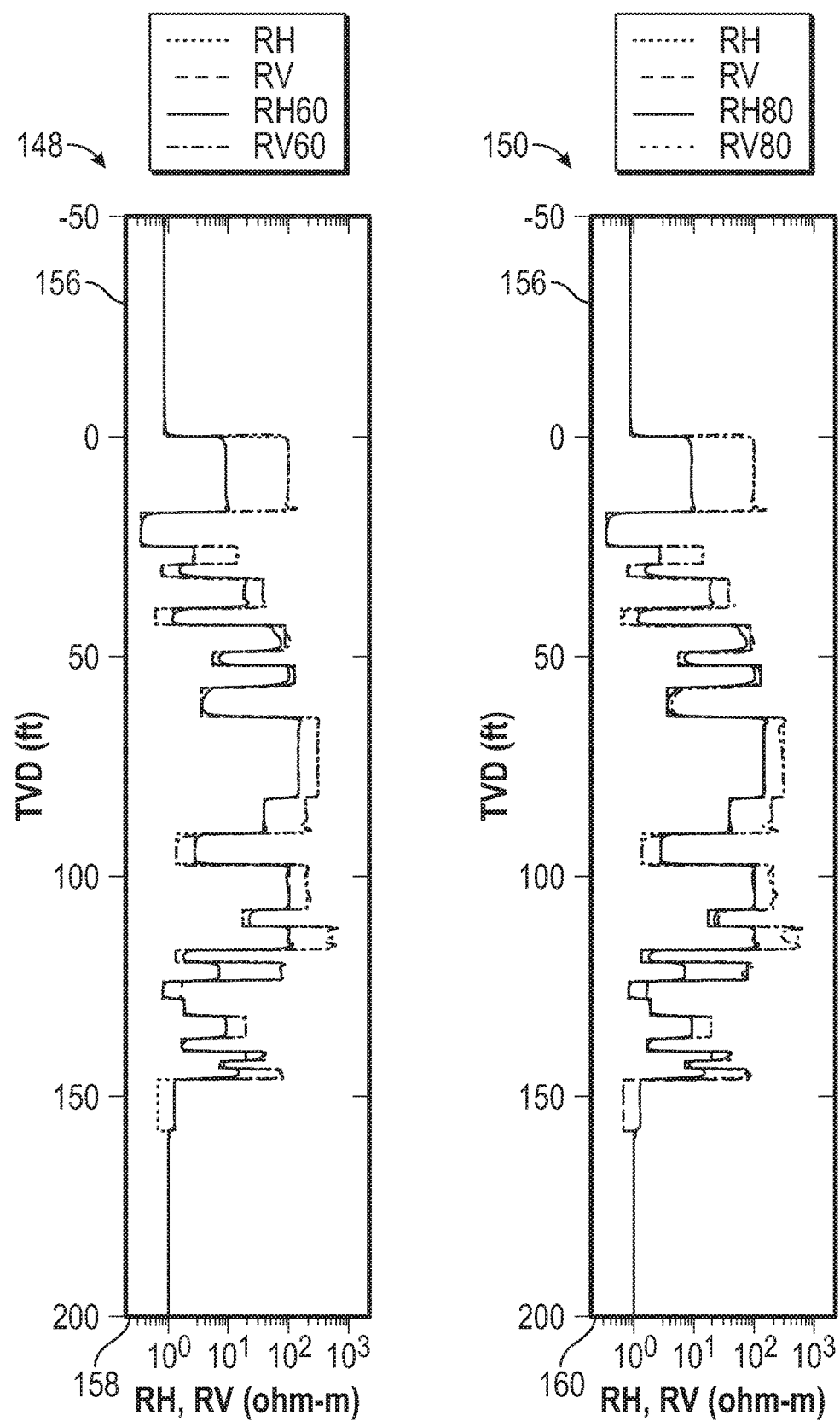
FIG. 9A is an example of horizontal resistivity logs and vertical resistivity logs determined with inversion in an anisotropic Oklahoma model of a relative dip of 60 degrees, in accordance with aspects of the present disclosure.
Figure 9B:
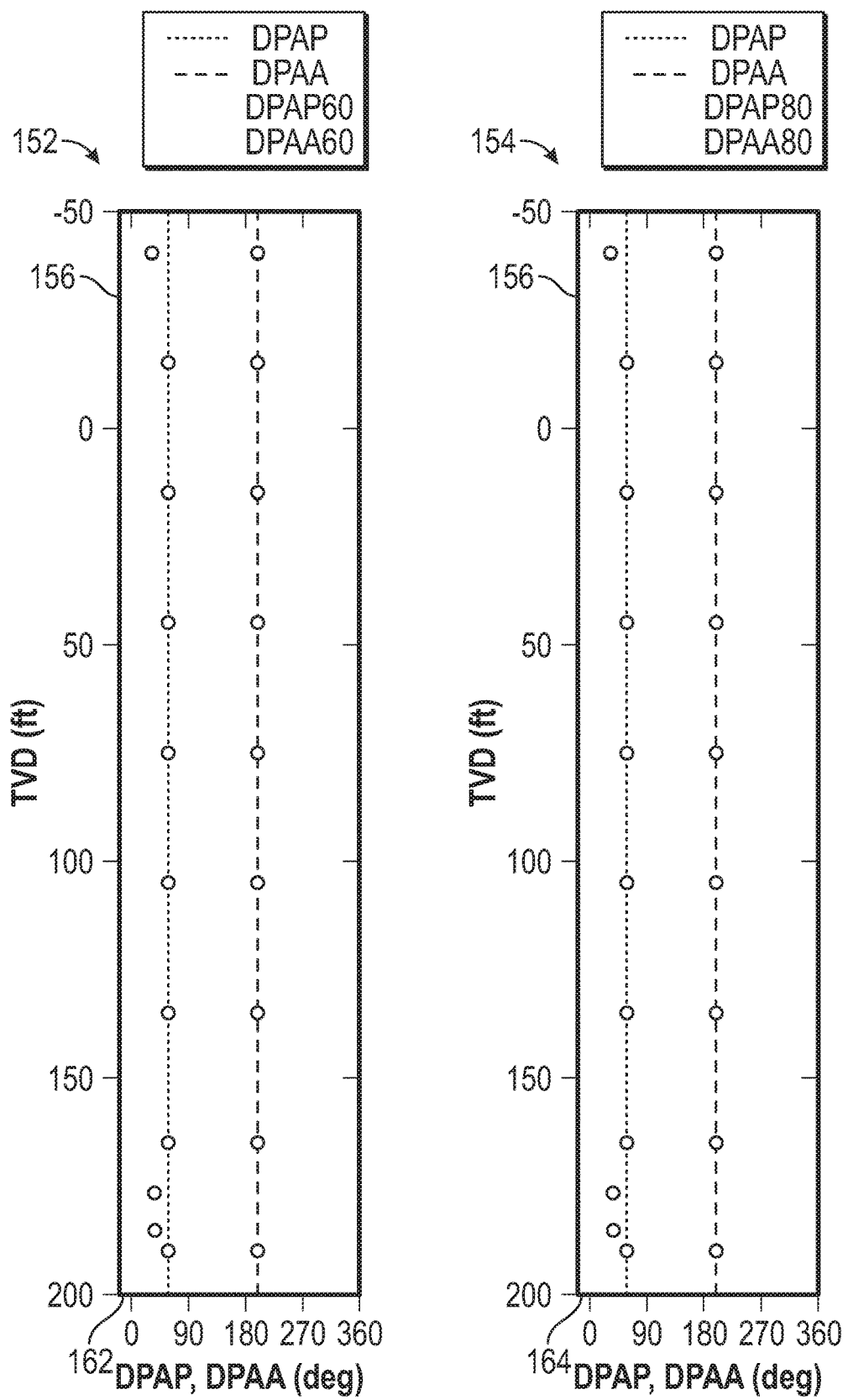
FIG. 9B is an example of dip logs and azimuth logs determined with inversion in an anisotropic Oklahoma model of a relative dip of 60 degrees, in accordance with aspects of the present disclosure.

FIGS. 9A and 9B show panel 148, panel 150, panel 152, and panel 154 displaying well log data related to EM well logging measurements based on the anisotropic Oklahoma formation at 60 degrees relative dip. The well log data of the panel 148, the panel 150, the panel 152, and the panel 154 is depth (e.g., axis 156) versus a respective set of logs shown in axis 158, axis 160, axis 162, and axis 164. The panel 148 depicts depth versus horizontal and vertical resistivity logs obtained using the inversion process as discussed herein with one set of Rt Scanner data, the panel 150 depicts depth versus horizontal and vertical resistivity logs obtained with another set of Rt Scanner data, the panel 152 depicts depth versus dip and azimuth angles with the first set of Rt Scanner data, and the panel 154 depicts depth versus dip and azimuth angles with the second set of Rt Scanner data.

In the example shown in FIGS. 9A and 9B, the true relative dip and azimuth of the model are 60 degrees and 200 degrees respectively. Because the data are acquired along the measured depth, a longer interval for data may be necessary to cover the same interval of formation for a lower dip model. With this consideration in mind, the whole zone is subdivided into 9 intervals, with each interval being 60 ft. with a transition zone of 50 ft. on each of the two sides. Moreover, in the inversion, the pixel height is set to 6 in. The dip and azimuth obtained with the inversion are displayed at the middle of each interval. The inverted resistivities are filtered with a Gaussian filter of a standard deviation of 0.25 ft. before being output. Overall, the observations are the same as those for the 30 degree case. That is, all the resistive beds, including two thin ones at the bottom at 139-145 ft., are well resolved on both inverted horizontal and resistivity logs. And comparatively, the accuracy of inverted horizontal resistivities RH60 and RH80 is better than that of the inverted vertical resistivities RV60 and RV80. An additional observation is that the artificial spikes or overshoots that occur around bed boundaries are slightly more significant than in the 30 degree case, indicating that more high frequency components of the formation are missing at 60 degree dip and cannot be recovered with the inversion.

Accordingly, the present disclosure relates to techniques for generating and analyzing anisotropic properties of geological formation using electromagnetic well logging measurements. In some embodiments, the resistivity well logging data are inverted based on a cost function that includes a plurality of terms associated with a horizontal resistivity and a vertical resistivity. As discussed herein, cost function may include a data misfit term, (e.g., $\chi^2$), an entropy term (e.g., $\mathcal{L}_P$), and a smoothness term (e.g., $\mathcal{L}_S$). In some embodiments, the inversion may include determining two regularization terms (e.g., $\gamma_P$ and $\gamma_S$) that are proportional to the data misfit term to avoid potential bias during iterations of the inversion that may result from the regularization terms. In some embodiments, the smoothness term may include relaxation factors (e.g., $\mu_S$ and $\mu_P$) that are configured to account for the different of data sensitivity between $\sigma_v$ and $\sigma_h$. In this way, the techniques of the present disclosure improve methods for determining physical properties of geological formations where anisotropy in conductivity and/or resistivity may exist by including the vertical terms and the horizontal terms in the cost function so the resolution of the anisotropy (e.g., variation of vertical resistivity) is not suppressed during the inversion.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
obtaining, via a processor, multi-axial electromagnetic (EM) measurements in a wellbore through a geological formation using one or more multi-axial EM downhole well logging tools; inverting, via the processor, the multi-axial EM measurements based on a formation model to determine horizontal conductivity, vertical conductivity, dip and azimuth of the formation, wherein inverting the multi-axial EM measurements based at least in part on the formation model comprises minimizing a cost function having a data misfit term, an entropy term and a smoothness term, wherein the smoothness term comprises a horizontal smoothness term and a vertical smoothness term, wherein the formation model comprises a plurality of geological layers associated with a plurality of regions of the geological formation, and wherein each geological layer of the plurality of geological layers comprises a respective vertical resistivity value and a respective horizontal resistivity value, and wherein the horizontal smoothness term is based at least in part on a horizontal relaxation factor associated with the respective horizontal resistivity value of each geological layer of the plurality of geological layers; and wherein the vertical smoothness term is based at least in part on a vertical relaxation factor associated with the respective vertical resistivity value of each geological layer of the plurality of geological layers; and wherein the horizontal relaxation factor and the vertical relaxation factor are each configured to account for a difference of data sensitivity between the respective horizontal resistivity value and the respective vertical resistivity value of each geological layer of the plurality of geological layers; and
generating, via the processor, horizontal resistivity and conductivity logs or vertical resistivity and conductivity logs, or both, of the geological formation as well as dip and azimuth logs based at least in part on the output of the inversion of the multi-axial EM measurements.

2. The method of claim 1, wherein at least one geological layer of the plurality of geological layers is associated with a region of the geological formation having a prescribed height.

3. The method of claim 1, wherein the vertical relaxation factor or the horizontal relaxation factor are based at least in part on a ratio of the Hessians of the smoothness term and the data misfit term.

4. The method of claim 1, wherein the vertical relaxation factor, the horizontal relaxation factor, or both, is dynamically adjusted during an iteration of the inversion.

5. The method of claim 1, comprising:
generating a dip log, azimuth log, or a data misfit log, or any combination thereof, based at least in part on the output of the inversion of the multi-axial EM measurements.

6. The method of claim 1, wherein inverting the multi-axial EM measurements comprises dynamically adjusting one or more regularization terms during the inversion based at least in part on the data misfit term, wherein dynamically adjusting the one or more regularization terms modifies a weight of the smoothness term, the entropy term, or both.

7. The method of claim 1, comprising:
filtering and outputting the horizontal conductivity log and the vertical conductivity log based at least in part on a low-pass filter; and
generating and outputting horizontal resistivity log, vertical resistivity log, or both, based at least in part on the horizontal conductivity and vertical conductivity.

8. The method of claim 1, wherein a stopping criteria for the inversion is based at least in part on the misfit term.

9. An article of manufacture comprising tangible, non-transitory, machine-readable media comprising instructions that, when executed by a processor, cause the processor to:
receive multi-axial electromagnetic (EM) measurements associated with a geological formation obtained by one or more multi-axial EM well logging tools;
invert the multi-axial EM measurements based at least in part on a formation model to determine horizontal conductivity, vertical conductivity, dip and azimuth of the formation, wherein inverting the multi-axial EM measurements based at least in part on the formation model comprises minimizing a cost function having a data misfit term, an entropy term and a smoothness term, wherein the smoothness term comprises:
a horizontal smoothness term based at least in part on a horizontal relaxation factor; and
a vertical smoothness term based at least in part on a vertical relaxation factor, wherein the vertical relaxation factor, the horizontal relaxation factor, or both, are based at least in part on a ratio of the Hessians of the smoothness term and the data misfit term; and
generate horizontal conductivity log, vertical conductivity log, or both, of the geological formation based at least in part on the output of the inversion of the multi-axial EM measurements.

10. The article of manufacture of claim 9, wherein formation model comprises a plurality of geological layers associated with a plurality of regions of the geological formation, and wherein each geological layer of the plurality of geological layers comprises a respective vertical resistivity value and a respective horizontal resistivity value.

11. The article of manufacture of claim 10, wherein the cost function is discretized based at least in part on the respective vertical resistivity value and the respective horizontal resistivity value of each geological layer of the plurality of geological layers.

12. The article of manufacture of claim 9, wherein the cost function comprises a horizontal entropy term and a vertical entropy term.

13. The article of manufacture of claim 9, wherein the cost function is minimized based at least in part on a Gauss-Newton method.

14. The article of manufacture of claim 9, wherein the cost function is minimized iteratively until a threshold is reached, wherein the threshold is based at least in part on the data misfit term.

15. A system comprising:
one or more multi-axial electromagnetic (EM) well logging tools configured to obtain one or more multi-axial EM measurements from a geological formation;
a processor; and
a memory storing instructions configured to be executed by the processor, the instructions cause the processor to:
receive the multi-axial EM measurements from the one or more multi-axial EM well logging tools;
invert the multi-axial EM measurements based at least in part on a formation model, wherein inverting comprises minimizing a cost function having a data misfit term, a smoothness term, and an entropy term to determine horizontal conductivity, vertical conductivity, dip and azimuth of the formation, wherein the formation model comprises a plurality of geological layers associated with a plurality of regions of the geological formation, and wherein each geological layer of the plurality of geological layers comprises a respective vertical resistivity value and a respective horizontal conductivity value, wherein the smoothness term comprises a horizontal smoothness term and a vertical smoothness term, where: the horizontal smoothness term is based at least in part on a horizontal relaxation factor associated with the respective horizontal conductivity value of each geological layer of the plurality of geological layers; the vertical smoothness term is based at least in part on a vertical relaxation factor associated with the respective vertical conductivity value of each geological layer of the plurality of geological layers; and the horizontal relaxation factor and the vertical relaxation factor are configured to account for a difference in data sensitivity between the sensitivities of the respective horizontal resistivity value and the respective vertical resistivity value of each geological layer of the plurality of geological layers, and wherein inverting the multi-axial EM measurements comprises:
dynamically adjusting one or more regularization terms during the inversion based at least in part on the data misfit term, wherein dynamically adjusting the one or more regularization terms modifies a weight of the smoothness term, the entropy term, or both; and
generate a plurality of horizontal conductivity values, a plurality of vertical conductivity values associated with the geological formation based at least in part on the output of the inversion of the multi-axial EM measurements.

16. The system of claim 15, wherein the instructions cause the processor to:
output a horizontal resistivity log based at least in part on the plurality of horizontal conductivity values; a vertical resistivity log based at least in part on the plurality of vertical conductivity values, or both.

* * * * *